(12) United States Patent
Wu et al.

(10) Patent No.: US 12,511,938 B2
(45) Date of Patent: Dec. 30, 2025

(54) LOCKER WITH MOTION SENSOR

(71) Applicant: PixArt Imaging Inc., Hsin-Chu County (TW)

(72) Inventors: Chih-Huan Wu, Hsin-Chu County (TW); Wen-Han Yao, Hsin-Chu County (TW); Yi-Hsien Ko, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 107 days.

(21) Appl. No.: 18/522,295

(22) Filed: Nov. 29, 2023

(65) Prior Publication Data

US 2024/0096135 A1    Mar. 21, 2024

Related U.S. Application Data

(63) Continuation-in-part of application No. 18/244,296, filed on Sep. 11, 2023, now Pat. No. 12,058,467, and a continuation-in-part of application No. 18/233,892, filed on Aug. 15, 2023, said application No. 18/244,296 is a continuation of application No. 18/071,477, filed on Nov. 29, 2022, now Pat. No. 11,792,550, which is a continuation of application No. 17/672,028, filed on Feb. 15, 2022, now Pat. No. 11,546,540, said application No. 18/233,892 is a continuation of application No. 17/333,022, filed on May 28, 2021, now Pat. No. 11,783,633, said application No. 17/672,028 is a continuation of application No. 17/009,417, filed on Sep. 1, 2020, now Pat. No. 11,290,671, said application No. 17/333,022 is a continuation of application No. 16/893,936, filed on Jun. 5, 2020, now Pat. No. 11,055,548.

(51) Int. Cl.
*G06V 40/20* (2022.01)
*G06T 7/254* (2017.01)
*G06V 10/94* (2022.01)
*H04N 25/75* (2023.01)

(52) U.S. Cl.
CPC .............. *G06V 40/20* (2022.01); *G06T 7/254* (2017.01); *G06V 10/94* (2022.01); *H04N 25/75* (2023.01)

(58) Field of Classification Search
CPC ........ G06V 40/20; G06V 10/94; G06V 10/10; G06V 20/52; G06T 7/254; H04N 25/75; H04N 25/707; H04N 25/47
See application file for complete search history.

(56) References Cited

U.S. PATENT DOCUMENTS

| 2018/0167575 A1* | 6/2018 | Watanabe | H04N 25/78 |
| 2019/0026901 A1* | 1/2019 | Fu | H04N 25/76 |
| 2025/0014337 A1* | 1/2025 | Schroeder | G06T 5/70 |

FOREIGN PATENT DOCUMENTS

CN          102196191 A       9/2011

* cited by examiner

*Primary Examiner* — Albert H Cutler
(74) *Attorney, Agent, or Firm* — WPAT, PC

(57) ABSTRACT

There is provided a locker with a motion sensor. The motion sensor identifies whether an object is put into or taken out from the locker by calculating coordinates of the object using a motion detection algorithm, by calculating a moving vector of the object using an image time differential algorithm or by comparing a current image frame and a background image frame, and outputs a put-in signal and a taken-out signal to a post control system.

9 Claims, 18 Drawing Sheets

LOCKER WITH MOTION SENSOR

The present application is a continuation-in-part application of U.S. patent application Ser. No. 18/233,892 filed on Aug. 15, 2023, which is a continuation application of U.S. patent application Ser. No. 17/333,022 filed on May 28, 2021, which is a continuation application of U.S. patent application Ser. No. 16/893,936 filed on Jun. 5, 2020, the disclosures of which are hereby incorporated by reference herein in their entirety.

The present application is also a continuation-in-part application of U.S. patent application Ser. No. 18/244,296 filed on Sep. 11, 2023, which is a continuation application of U.S. patent application Ser. No. 18/071,477 filed on Nov. 29, 2022, which is a continuation application of U.S. patent application Ser. No. 17/672,028 filed on Feb. 15, 2022, which is a continuation application of U.S. patent application Ser. No. 17/009,417 filed on Sep. 1, 2020, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a locker with a motion sensor and, more particularly, to a locker that uses a motion sensor to perform the motion detection, the image time difference and the background comparison to identify a moving direction and existence of an object inside the locker.

2. Description of the Related Art

In the sensor having a pixel matrix, in order to detect motion, a readout circuit reads a first image frame from the pixel matrix at a first time and saves the first image frame to a first frame buffer. Then, at a second time, the readout circuit reads a second image frame from the pixel matrix, and saves the second image frame in a second frame buffer.

In the motion recognition, a processor accesses the first image frame from the first frame buffer and accesses the second image frame from the second frame buffer to perform the calculation.

That is, the sensor needs at least two frame buffers.

Accordingly, it is necessary to provide a motion sensor that needs not to previously save pixel data acquired at different times respectively into frame buffers before the pixel calculation.

SUMMARY

The present disclosure provides a locker arranged with a smart motion detection that identifies an object position in the locker according to multiple pixels detecting a motion.

The present disclosure further provides a locker arranged with a motion sensor for identifying a moving direction of an object inside the locker according to a moving vector of a pixel region having an identifiable brightness variation in a temporal difference image frame.

The present disclosure further provides a locker arranged with a motion sensor for identifying whether an object is in the locker by comparing a current image frame and a background image frame.

The present disclosure provides a locker including a cabinet body, a cabinet door and a motion sensor. The cabinet body has an inner space. The cabinet door is used to seal or open the inner space. The motion sensor is arranged inside the locker, is used to acquire images of the inner space when the cabinet door is opened, and includes a pixel matrix and a processor. The pixel matrix has a plurality of pixels arranged in a matrix, and each of the plurality of pixels is used to output a temporal difference pixel data. The processor is used to identify multiple pixels detecting a motion according to the temporal difference pixel data, and identify an object coordinate in the locker according to the multiple pixels.

The present disclosure further provides a locker including a cabinet body, a cabinet door and a motion sensor. The cabinet body has an inner space. The cabinet door is used to seal or open the inner space. The motion sensor is arranged inside the locker, is used to acquire image frames of the inner space when the cabinet door is opened, and includes a pixel matrix and a processor. The pixel matrix has a plurality of pixels arranged in a matrix, and configured to output the image frames. The processor is used to identify a moving vector of at least one pixel region having a brightness variation exceeding a variation threshold according to a temporal difference image frame to accordingly output a direction signal.

The present disclosure further provides a locker including a cabinet body, a cabinet door, a frame buffer, a motion sensor and a processor. The cabinet body has an inner space. The cabinet door is used to seal or open the inner space. The frame buffer is used to record a background image frame. The motion sensor is arranged inside the locker, and is used to acquire a current image frame of the inner space. The processor is used to compare the current image frame and the background image frame to identify an object in the inner space.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The motion sensor and the navigation device of the present disclosure respectively identify the motion and the lift-up according to sequentially temporal and spatial differenced pixel data. The temporal difference and the spatial difference of the present disclosure are performed during reading pixel data from pixels so as to accomplish the hybrid difference calculation in the analog phase.

Figure 1A:
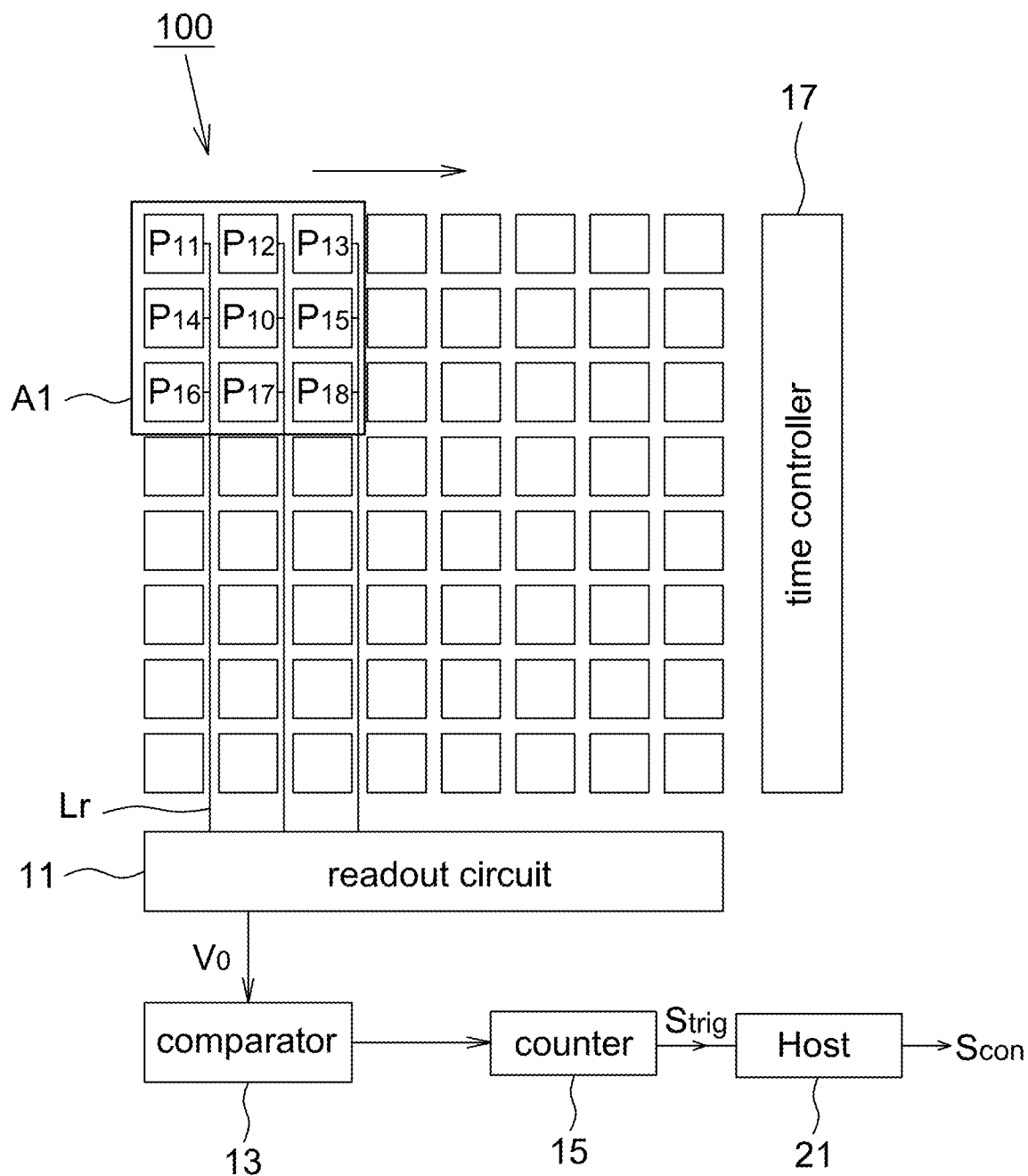
FIGS. 1A-1D are operational schematic diagrams of an optical sensor according to one embodiment of the present disclosure.

Referring to FIG. 1A, it is a schematic diagram of an optical sensor (e.g., a CMOS image sensor, but not limited to) according to one embodiment of the present disclosure. The optical sensor is adapted to, for example, a security system as a motion sensor, but not limited to. The optical sensor generates a trigger signal $S_{trig}$ to a host 21 when detecting the motion so as to activate at least one of a recording procedure, increasing a frame rate of a pixel matrix, turning on a light source, increasing a frame size of image frames outputted by the pixel matrix, but not limited thereto. In some aspects, when the optical sensor does not detect any motion, the host 21 may enter a sleep mode or low power mode to reduce the power consumption.

The host 21 is, for example, arranged at different locations from the optical sensor (e.g., arranged in a camera), but coupled to the optical sensor to transmit control signals and image data therebetween.

The optical sensor includes a pixel matrix 100, a readout circuit 11, a comparator 13, a counter 15 and a timing controller 17, wherein although FIGS. 1A to 1D show that the comparator 13 and the counter 15 are separated circuits, the present disclosure is not limited thereto. In other aspects, the comparator 13 and counter 15 are both included in the readout circuit 11 or in a processor (not shown) of the optical sensor, wherein the processor is, for example, a micro controller unit (MCU), a digital signal processor (DSP) or an application specific integrated circuit (ASIC).

The pixel matrix 100 includes multiple pixels (8×8 pixels being shown in FIGS. 1A-1D as an example) arranged in a matrix. Each of the multiple pixels is used to output temporal difference pixel data. The temporal difference pixel data is, for example, a difference value of charges generated by a photodiode of each of the multiple pixels between a current time and a reference time (e.g., a new reference time being set every a predetermined time interval during operation). Or, the temporal difference pixel data is, for example, a difference value of charges generated by a photodiode of each of the multiple pixels between a current time and a previous time separated by a frame period.

The pixel structure capable of calculating and outputting the temporal difference pixel data is known to the art and is not a main objective of the present disclosure, e.g. referencing to FIG. 1(a) of a document entitled "Event-based Vision: A Survey" from https://arxiv.org/pdf/1904.08405, the full disclosure of which is incorporated herein by reference. The present disclosure is to use the temporal difference pixel data to realize the motion detection and lift-up detection.

The temporal difference pixel data is determined according to the pixel circuit being adopted. In one non-limiting aspect, when charges generated by the photodiode between two times are increased to be more than a predetermined threshold, a high voltage (e.g., indicated by "1") is outputted as the temporal difference pixel data; whereas when charges generated by the photodiode between two times are decreased to be lower than a predetermined threshold, a low voltage (e.g., indicated by "0") is outputted as the temporal difference pixel data; or vice versa. That is, the temporal difference pixel data is a voltage difference caused by charges generated by the photodiode between two times, i.e. current and reference times or current and previous times.

The readout circuit 11 sequentially reads the pixel matrix 100 using a readout block, and calculates the spatial difference of the temporal difference pixel data between a center pixel and adjacent pixels of the center pixel of the readout block.

For example in FIG. 1A, the readout circuit 11 reads 9 temporal difference pixel data from a center pixel P10 and adjacent pixels P11 to P18 of the center pixel P10 of the readout block A1 simultaneously at a first time. The pixel data that can be read by the readout circuit 11 is determined by control signals (e.g., row selection signals and readout signals) from the timing controller 17.

In one non-limiting aspect, when reading the 9-temporal difference pixel data, the readout circuit 11 first calculates difference values between the temporal difference pixel data of the center pixel P10 and the temporal difference pixel data of each of the adjacent pixels P11 to P18 as a way of calculating the spatial difference. Then, the readout circuit 11 calculates a summation of 8 absolute values of the calculated 8 difference values as a hybrid difference of the 9 pixels. The comparator 13 then compares the summation with a predetermined value (e.g., a voltage value, a current value or a charging/discharging time according to different applications) to determine a brightness variation within the readout block A1. The counter 15 increases a count value by 1 when the hybrid difference of the readout block A1 is larger than or equal to the predetermined value; otherwise, the count value is not increased.

Figure 1B:
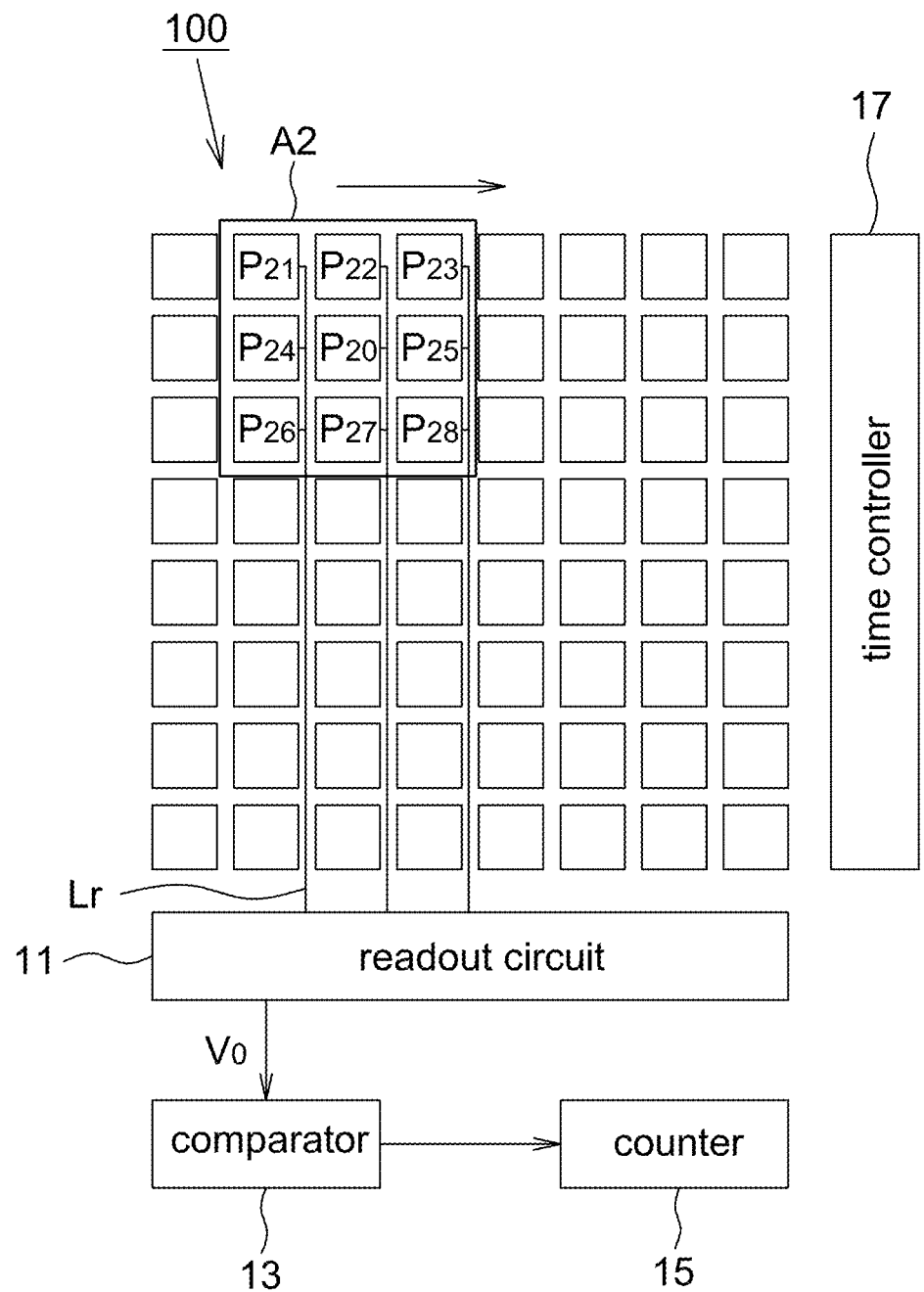
Figure 1C:
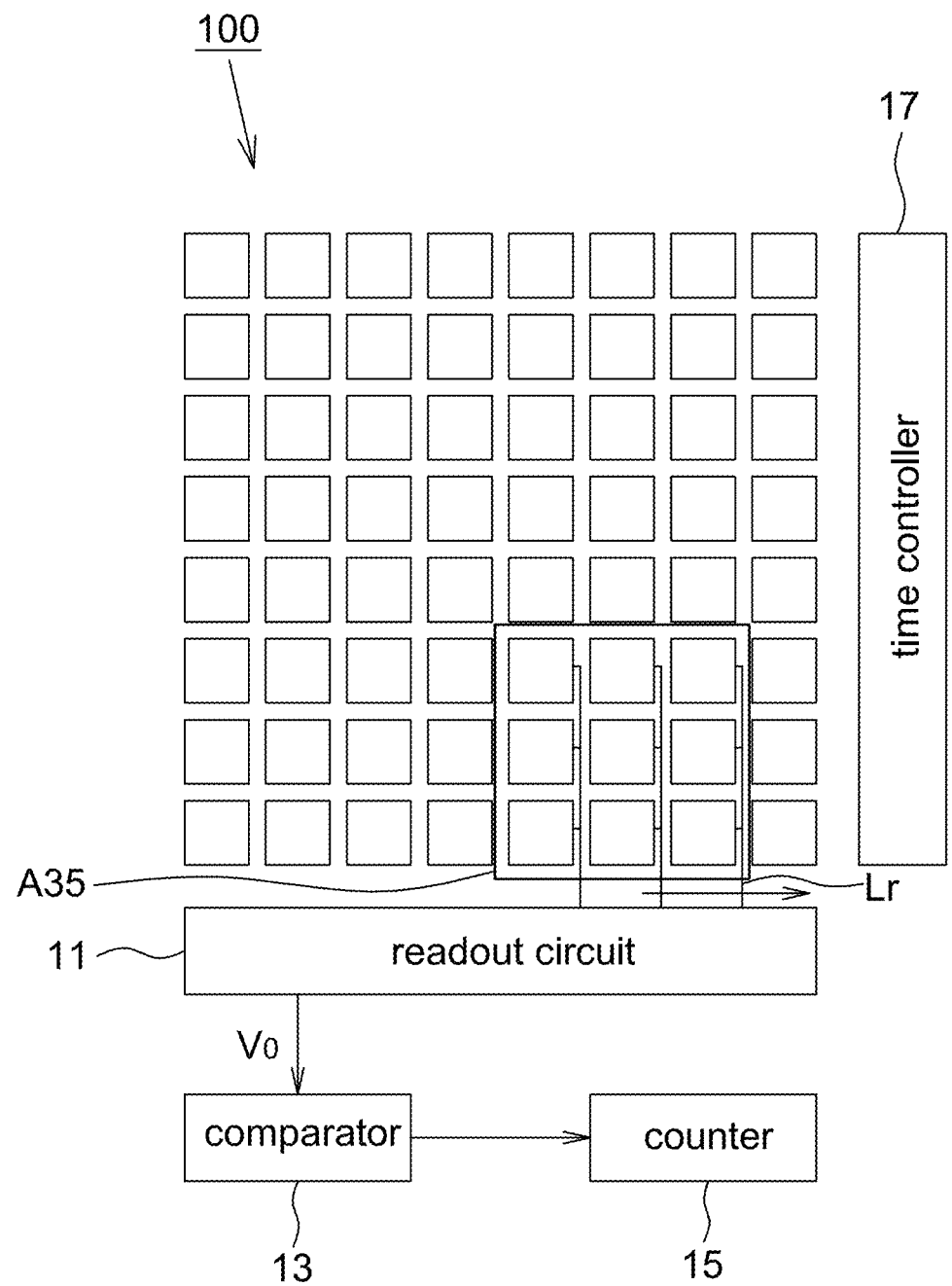

Next, the readout block 100 moves one pixel pitch rightward to a position A2 as shown in FIG. 1B. The readout circuit 11 reads 9-temporal difference pixel data from a center pixel P20 and adjacent pixels P21 to P28 of the center pixel P20 of the readout block A2 simultaneously at a second time. The readout circuit 11 calculates a summation of 8 absolute values of the calculated 8 difference values as a hybrid difference of the 9 pixels in the readout block A2 similar to calculating the hybrid difference of the readout block A1 mentioned above. The comparator 13 also compares the summation of the readout block A2 calculated by the readout circuit 11 with the predetermined value. The counter 15 also increases the count value by 1 when the hybrid difference of the readout block A2 is larger than or equal to the predetermined value; otherwise, the count value is not increased.

Figure 1D:
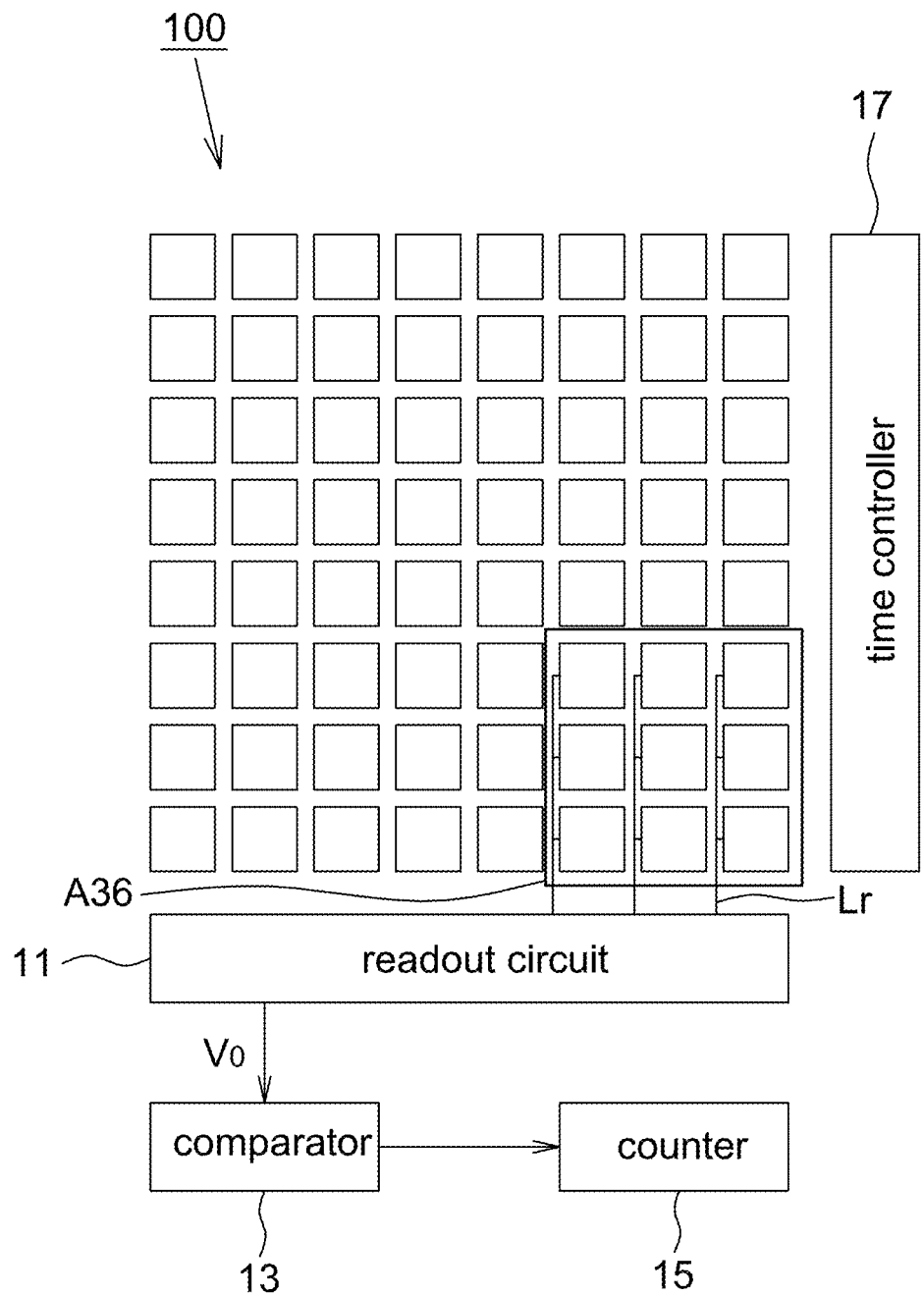

The time controller 17 sequentially controls readable pixels in the pixel matrix 100 to allow the readout circuit 11 to sequentially (e.g., firstly rightward and then downward) read all pixels in the pixel matrix 100 till a hybrid difference of the readout block A36 (as shown in FIG. 1D) is calculated and compared with the predetermined value by the comparator 13. In this aspect, the hybrid differences associated with the readout blocks A1 to A36 are values after the temporal difference and spatial difference sequentially.

The counter 15 counts/accumulates a number of readout blocks in the pixel matrix 100 having the hybrid difference larger than or equal to the predetermined value. When the counted/accumulated number is larger than or equal to a predetermined number (e.g., a counting threshold which is a predetermined ratio of a number of pixels of the pixel matrix 100), it means that the motion is detected and the counter 15 sends a trigger signal $S_{trig}$ to the host 21.

It should be mentioned that, in another aspect, as long as the counted/accumulated number is larger than or equal to the predetermined number, the scanning of the pixel matrix 100 is stopped and the counter 15 sends a trigger signal $S_{trig}$ to the host 21. That is, the readout circuit 11 is not necessary to read till the last readout block A36 if the predetermined number is reached in any previous readout block.

FIGS. 1A to 1D only show readout lines Lr connecting the readout circuit 11 and readable pixels to indicate the temporal difference pixel data of these pixels can be read by the readout circuit 11 via the readout line Lr. Other non-readable pixels are not shown to be connected to the readout line Lr for simplification purpose. The arrow symbols in FIGS. 1A to 1D indicate a moving direction of the readout block.

It should be mentioned that although FIGS. 1A to 1D show that the readout blocks A1 to A36 are respectively a pixel range including 3×3 pixels, the present disclosure is not limited thereto. In the aspect that the pixel matrix 100 includes more pixels, the readout block is selected to include more pixels, e.g., a pixel range having 5×5 pixels.

Figure 2:
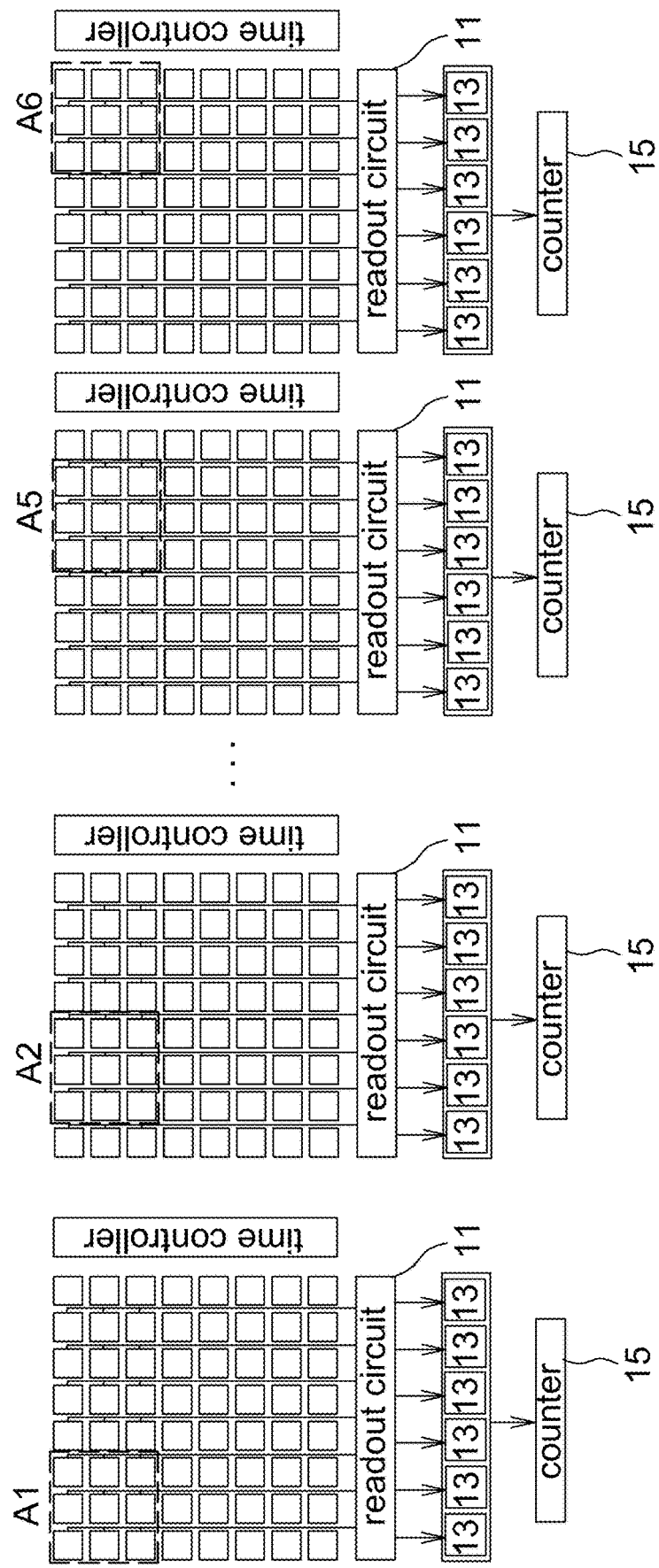
FIG. 2 is an operational schematic diagram of an optical sensor according to another embodiment of the present disclosure.

Referring to FIG. 2, in another aspect, the optical sensor includes six comparators 13. The readout circuit 11 simultaneously reads 3 rows of pixel data of the pixel matrix 100, and obtains the hybrid difference of every readout block A1 to A6 using the same way mentioned above. The comparators 13 then compare the hybrid difference with a predetermined value to determine a brightness variation of every readout block A1 to A6. For example, the most left comparator 13 compares the hybrid difference associated with the readout block A1 with the predetermined value; the second-left comparator 13 compares the hybrid difference associated with the readout block A2 with the predetermined value; . . . ; the second-right comparator 13 compares the hybrid difference associated with the readout block A5 with the predetermined value; and the most right comparator 13 compares the hybrid difference associated with the readout block A6 with the predetermined value. The counter 15 counts a number of readout blocks A1 to A6 having the hybrid difference larger than the predetermined value.

Then, the 3 pixel rows to be read by the readout circuit 11 moves one pixel pitch downward each time till the last row of the pixel matrix 100 is read or scanned, and the readout circuit 11, comparators 13 and the counter 15 repeat the process as mentioned in the previous paragraph. The counter sends a trigger signal $S_{trig}$ when a predetermined counted number is reached (after scanning all pixels or a part of pixels of the pixel matrix 100). It is appreciated that when the pixel matrix has more columns, more comparators 13 may be used.

Figure 3:
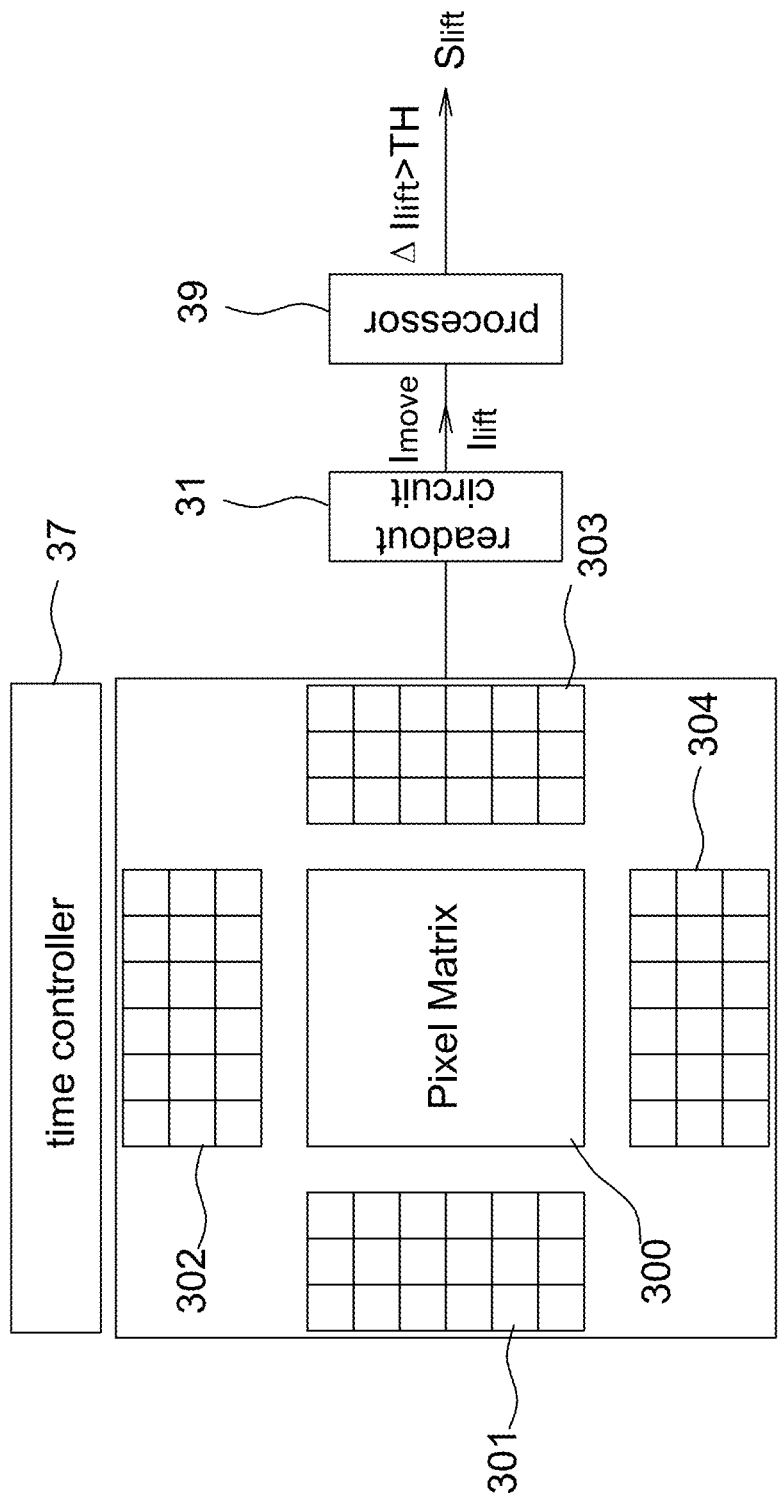
FIG. 3 is a schematic block diagram of a navigation device according to one embodiment of the present disclosure.

Please referring to FIG. 3, it is a schematic diagram of a navigation device according to one embodiment of the present disclosure. The navigation device is, for example, an optical mouse having an optical sensor (e.g., a CMOS image sensor, but not limited thereto) which includes a first pixel region 300, at least one second pixel region (e.g., 4 second pixel regions 301 to 304 respectively arranged at 4 sides of the first pixel region 300 being shown herein), a readout circuit 31, a timing controller 37 and a processor 39, wherein the processor 39 includes, for example, an MCU, a DSP or an ASIC. The timing controller 37 is used to generate control signals (e.g., including row selection signals and readout signals) to cause the readout circuit 31 to read pixel data of every pixel.

It should be mentioned that although FIG. 3 shows that the second pixel regions 301 to 304 are separated from the first pixel region 300 by a distance, the present disclosure is not limited thereto. In other aspects, the second pixel regions 301 to 304 are connected to the first pixel region 300.

Figure 4:
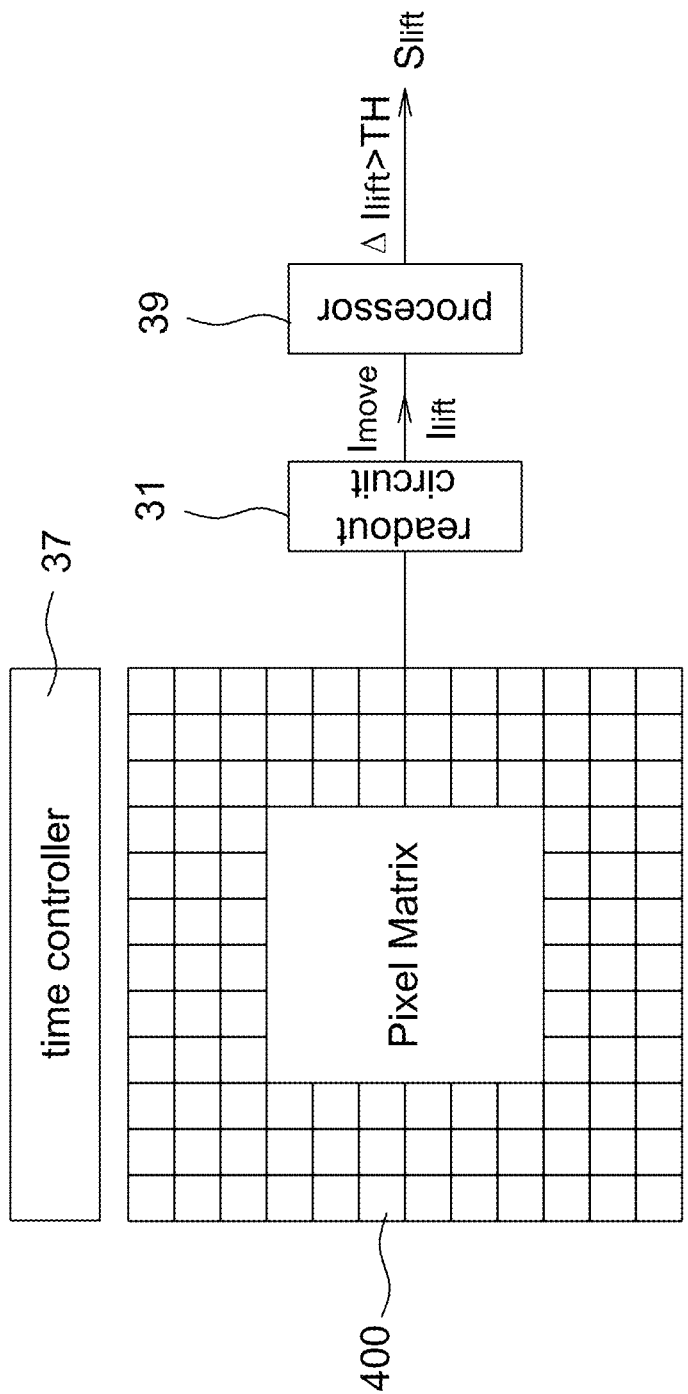
FIG. 4 is a schematic block diagram of a navigation device according to another embodiment of the present disclosure.

It should be mentioned that although FIG. 3 shows that the first pixel region 300 and the second pixel regions 301 to 304 are read by the same readout circuit 31, the present disclosure is not limited thereto. In other aspects, the first pixel region 300 and the second pixel regions 301 to 304 are read by different readout circuits, respectively. In one aspect, the first pixel region 300 and the second pixel regions 301 to 304 are arranged in the same base layer. As shown in FIG. 4, the second pixel region (e.g., shown by the grid region) and the first pixel region (e.g., shown by the blank region) are different regions of the same pixel matrix 400.

This embodiment is described below using FIG. 3. One of ordinary skill in the art would understand the operation of FIG. 4 after understanding the operation of FIG. 3.

The first pixel region 300 is used to output first image data. A size of the first image data is determined according to a number of pixels included in a pixel matrix of the first pixel region 300. The readout circuit 31 outputs first image data $I_{move}$ to the processor after reading the first pixel region 300.

The second pixel regions 301 to 304 are arranged at four sides of the first pixel region 300. Each of the second pixel regions 301 to 304 is used to output second image data, respectively. More specifically, after reading the second pixel regions 301 to 304, the readout circuit 31 respectively outputs second image data $I_{lift}$ corresponding to each of the second pixel regions 301 to 304 to the processor 39. For example in FIG. 3, the readout circuit 31 outputs one first image data $I_{move}$ and four second image data $I_{lift}$ per frame period. In one aspect, the first image data $I_{move}$ and the second image data $I_{lift}$ contain pixel data captured in a current exposure period, but does not contain temporal difference pixel data. Frequencies of generating the first image data $I_{move}$ and the second image data $I_{lift}$ are identical to or different from each other without particular limitations.

The processor 39 calculates displacement of the navigation device according to the first image data $I_{move}$. The method of calculating the displacement is known to the art, and thus details thereof are not described herein. For example, the processor 39 calculates the displacement of the navigation device by comparing (e.g., calculating correlation) successive captured first image data $I_{move}$. The displacement is used to control, for example, a cursor shown on the display device.

The processor 39 further identifies whether the navigation device is lifted up according to the second image data $I_{lift}$. In one aspect, the processor 39 calculates a summation or an average pixel value of the second image data $I_{lift}$. The processor 39 identifies whether the navigation device is lifted up or not according to an absolute value of the summation or the average pixel value. For example, when the absolute value is larger than or equal to a threshold, it means that the navigation device is lifted up.

In another aspect, the processor 39 identifies whether the navigation device is lifted up or not according to a difference value of the absolute values between two second pixel regions, e.g., between 301 and 303 or between 302 and 304. For example, when the difference value is larger than or equal to a variation threshold, it means that the navigation device is lifted up; whereas when the difference value does not exceed the variation threshold, it means that the navigation device is not lifted up.

The second average pixel value is larger than or smaller than the first average pixel value depending on whether the second pixel regions 301 to 304 receive light emitted by a light source when the navigation device is not lifted up. When the processor 39 identifies that the temporal difference (i.e. from the first to second time) of one of the second pixel regions 301 to 304 is larger than or equal to the variation threshold, it means that at least one side of the navigation device is lifted up by a user. For example, when the absolute value associated with the second pixel region 301 is larger than or equal to the variation threshold, it means that a left side of the navigation device is lifted up by the user; when the absolute value associated with the second pixel region 302 is larger than or equal to the variation threshold, it means that an upper side of the navigation device is lifted up by the user; and so on.

When identifying that at least one side of the navigation device is lifted up by the user, the processor 39 generates a lift up signal $S_{lift}$ to perform corresponding controls, e.g., stopping control the cursor according to the displacement calculated from the first image data $I_{move}$, entering a power saving mode to reduce a frame rate of the sensor array 300 or turning off the light source, but not limited thereto. In one non-limiting aspect, the processor 39 performs different controls according to different sides of the navigation device being lifted up. For example, when the upper side of the navigation device is lifted up by the user, the cursor is controlled by a different ratio or a different multiple according to the displacement calculated from the first image data $I_{move}$; whereas when a lower side of the navigation device is lifted up by the user, the cursor is not controlled according to the displacement calculated from the first image data $I_{move}$, but the present disclosure is not limited thereto.

In another aspect, each pixel of the second pixel regions 301 to 304 is used to output temporal difference pixel data to form the second image data $I_{lift}$. As mentioned above, the temporal difference pixel data is a difference value of charges generated by a photodiode of the each pixel between a current time and a reference time; or a difference value of charges generated by a photodiode of the each pixel between a current time and a previous time separated by a frame period. In this aspect, the processor 39 is used to count a number of pixels, in each of the second image data $I_{lift}$ outputted by the second pixel regions 301 to 304, having the temporal difference pixel data larger than or equal to a predetermined threshold (e.g., counting a number of pixels outputting "1") to accordingly identify whether the navigation device is lifted up.

It should be mentioned that the processor 39 is not necessary to count all pixels of one second image data $I_{lift}$ to identify the lift. The lift is confirmed once the counted number of pixels of one second pixel region having a significant temporal difference pixel data (i.e. larger than or equal to a predetermined threshold) is larger than or equal to a predetermined counting threshold. After the lift is confirmed, the lift up signal $S_{lift}$ is sent and the counting is stopped.

In other words, when the navigation device is lifted up, pixel values at different times (i.e. the temporal difference pixel data) have a larger variation. Therefore, in this aspect, the processor 39 identifies a lift-up event by comparing the temporal difference pixel data with a predetermined threshold or value, and counting a number of pixels whose pixel values have a significant variation (i.e. exceeding predetermined threshold or value). The setting of the predetermined threshold and value reduces the noise interference.

As mentioned above, the processor 39 performs predetermined controls when a lift-up event is identified.

In the aspect that each of multiple pixels in the second pixel regions 301 to 304 outputs temporal difference pixel data, the readout circuit 31 further performs the spatial difference on the temporal difference pixel data to form a hybrid difference. The processor 39 (e.g., including a comparator and a counter) then identifies whether the navigation device is lifted up according to the hybrid difference.

More specifically, the readout circuit 31 reads each of the second pixel regions 301 to 304 using the readout block similar to FIGS. 1A to 1D, and calculates the spatial difference of the temporal difference pixel data between a center pixel and adjacent pixels of the center pixel, referring to the descriptions mentioned above. In this case, to allow the readout block to be able to sequentially scan the second pixel regions 301 to 304, each of the second pixel regions 301 to 304 includes at least 3×3 pixels. It is appreciated that when the readout block contains a pixel region having 5×5 pixels, each of the second pixel regions 301 to 304 includes at least 5×5 pixels.

In the aspect shown in FIG. 3, each of the second pixel regions 301 to 304 outputs 4 hybrid differences obtained by the readout circuit 31 using 4 readout blocks to scan the second pixel regions 301 to 304, respectively. As mentioned above, the readout circuit 31 calculates a difference value between the temporal difference pixel data of the center pixel and the temporal difference pixel data of each of the adjacent pixels and calculates a summation of 8 absolute values of the calculated difference values as the hybrid difference.

After receiving the hybrid differences from the readout circuit 31, the processor 39 compares the hybrid difference associated with each readout block with a predetermined value. When the hybrid difference of one readout block is larger than or equal to the predetermined value, a count value is increased by 1; on the contrary, the count value is not increased. The processor 39 counts a number of readout blocks with the hybrid difference thereof being larger than or equal to the predetermined value corresponding to each of the second pixel regions 301 to 304. When the counted number of readout blocks of one of the second pixel regions 301 to 304 is larger than or equal to a predetermined number, the navigation device is identified to be lifted up.

As mentioned above, the processor 39 is not necessary to count all readout blocks by scanning all pixels of each of the second pixel regions 301 to 304. As long as the predetermined number of one second pixel region is reached, the lift associated with the one second pixel region is confirmed and the scan is stopped.

For example, when more than 2 (i.e. the threshold being 2) readout blocks among 4 readout blocks (e.g., generated by scanning the second pixel region 301 in a longitudinal direction using control signals from the timing controller 37) of the second pixel region 301 have the hybrid difference larger than or equal to the predetermined value, it means that the left side of the navigation device is lifted up; and other sides can be identified using a similar way. The threshold is set according to different applications as long as it is smaller than or equal to a number of the readout blocks used in one second pixel region.

In this aspect, the processor 39 also calculates displacement of the navigation device according to the first image data $I_{move}$ as illustrated above.

As mentioned above, when identifying a lift-up event, the processor 39 performs the corresponding controls.

The $\Delta I_{lift}$ shown in FIGS. 3 and 4 is used to indicate a variation of an average pixel value, a counted number of pixels or a counted number of readout blocks in representing the time-variation of charges generated by the photodiode.

Figure 5A:
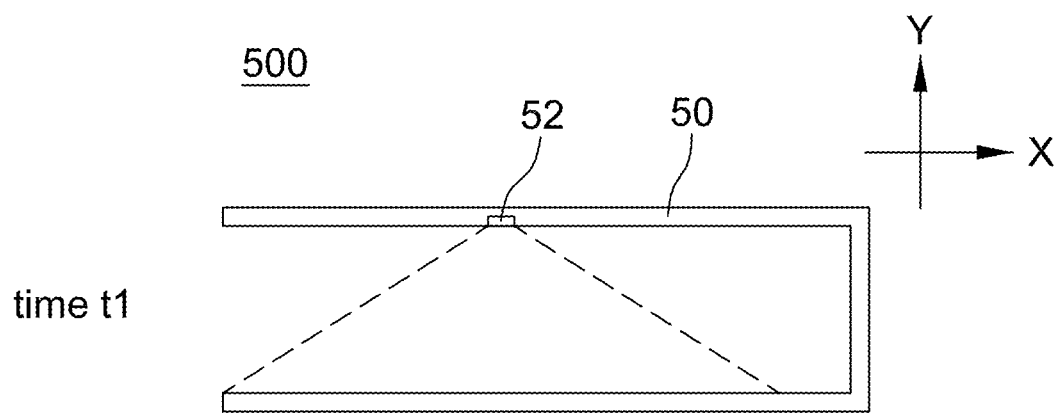
FIGS. 5A to 5C are schematic diagrams of different states of a locker according to one embodiment of the present disclosure.
Figure 5B:
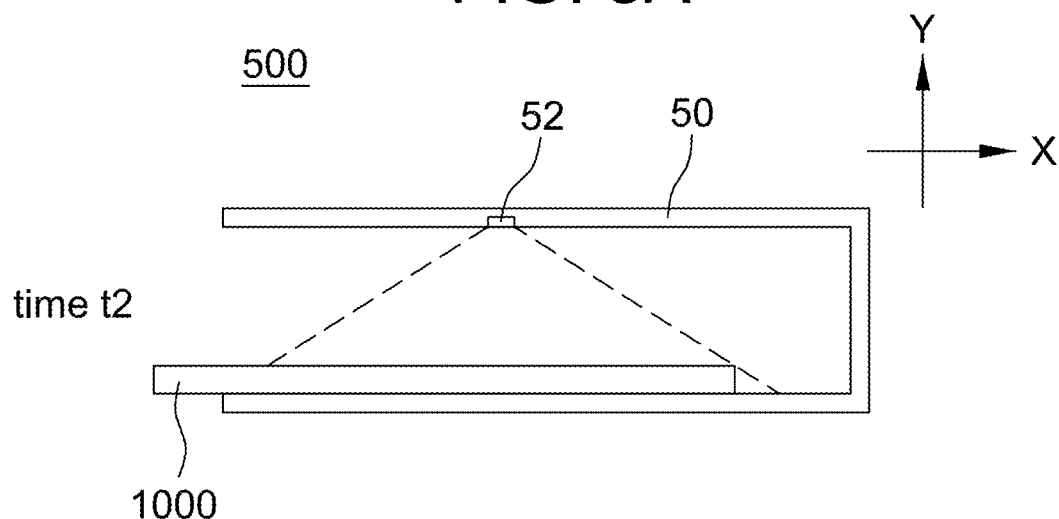
Figure 5C:
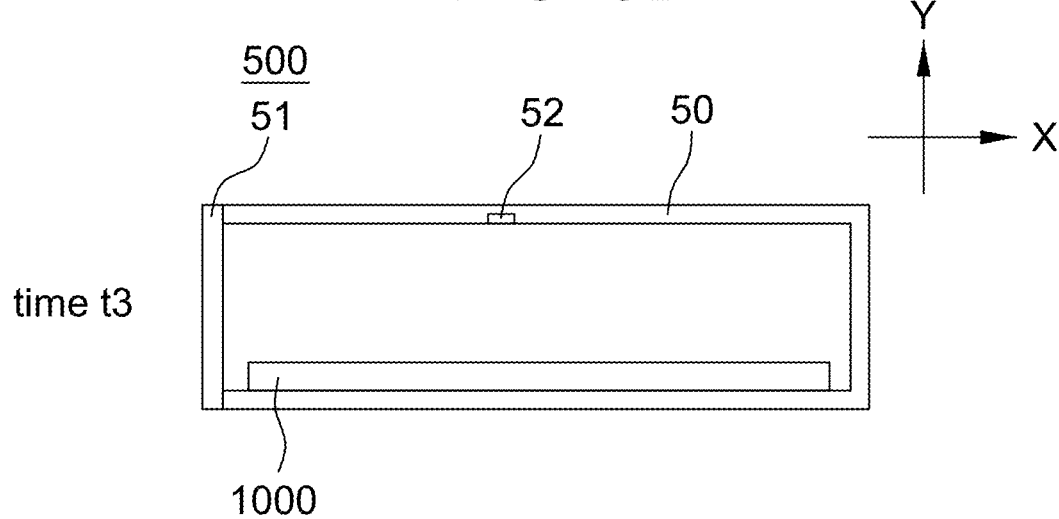

Please to FIGS. 5A to 5C, they are schematic diagrams of different states of a locker 500 adopting the motion sensor mentioned in the above embodiments. For example, FIG. 5A shows that a cabinet door 51 is opened at time t1 but there is no object entering an inner space of the locker 500; FIG. 5B shows that the cabinet door 51 is opened at time t2 and there is an object 1000 entering the inner space of the locker 500 (the opened cabinet door not shown in the cross sectional views in FIGS. 5A and 5B); and FIG. 5C shows that the cabinet door 51 is sealed at time t3 and there is an object 1000 inside the inner space of the locker 500. FIGS. 5A and 5B show that the motion sensor 52 acquires images, and FIG. 5C shows that the motion sensor 52 stops acquiring an image.

The locker 500 includes a cabinet body 50, a cabinet door 51 and a motion sensor 52. Please refer to FIG. 6, in one aspect the motion sensor 52 includes a pixel matrix 600, a timing controller 37, a readout circuit 31 and a processor 53. As mentioned above, the timing controller 37 is used to generate control signals to cause the readout circuit 31 to read pixel data of every pixel of the pixel matrix 600, and details thereof are not repeated herein.

The cabinet body 50 has an inner space for accommodating an object 1000, e.g., at least one package. A size and a shape of the inner space of the locker 50 are determined according to actual requirements without particular limitations.

The cabinet door 51 is used to seal/close and open the inner space. In one aspect, the locker 500 forms a wireless communication (e.g., Bluetooth, but not limited to) with a portable device such that when a user operates the portable device to select a cabinet door 51 or a locker 500, the corresponding cabinet door 51 is opened. In another aspect, the locker 500 has a human-machine interface (e.g., touch panel or keyboard), and the cabinet door 51 is opened when a user inputs a password. The cabinet door 51 is locked and unlocked, for example, using an electronic lock. When a cabinet door 51 is opened, the motion sensor 52 receives a signal to know that the cabinet door 51 is opened.

The motion sensor 52 is arranged inside the locker 500, and used to acquire images of the inner space when the cabinet door 51 is opened. The motion sensor 52 further includes a pixel matrix 600 and a processor (e.g., MCU, DSP or ASIC). As mentioned above, the pixel matrix 600 includes a plurality of pixels (e.g., shown as 12×12 pixels, but not limited to) arranged in a matrix, and each of the plurality of pixels is used to output temporal difference pixel data. As mentioned above, the temporal difference pixel data is a difference value of charges between a current time and a reference time generated by each of the plurality of pixels, and thus details thereof are not repeated herein.

The processor 53 is used to identify multiple pixels (e.g., less than a pixel number of the pixel matrix 600) that detect a motion according to the temporal difference pixel data, and identifies an object coordinate in the locker 500 according to the multiple pixels. For example, in FIG. 6, a region filled with slant lines indicates multiple pixels that detect a motion, e.g., front edge of the object 1000 inducing a motion. To calculate an object coordinate, in one aspect the processor 53 blocks the multiple pixels that detect a motion as a pixel region PX_mot, and determines the object coordinate in the locker 500 using the pixel region PX_mot.

Figure 7:
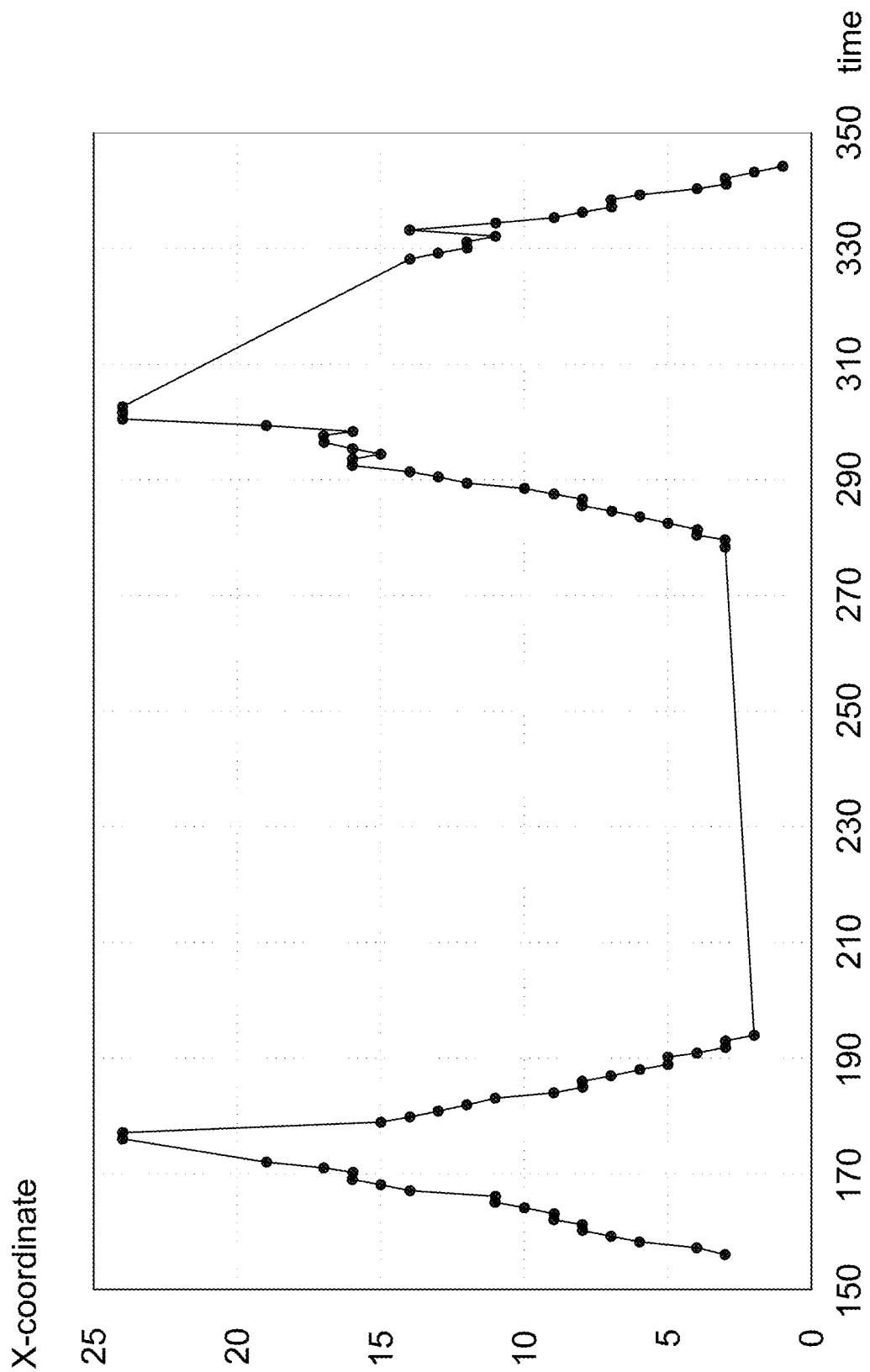
FIG. 7 is a schematic diagram of object coordinates at different times detected by a motion sensor of a locker according to one embodiment of the present disclosure.

For example, FIG. 7 shows a variation of object coordinates (e.g., taking a direction inserting into the locker 500 as an X-direction) with time.

As shown in FIG. 7, within a time interval from about 155 seconds to 175 seconds, and from about 280 seconds to 300 seconds, the X-coordinate is increasing, meaning that the object 1000 enters the locker 500; and within a time interval from about 175 seconds to 195 seconds, and from about 300 seconds to 354 seconds, the X-coordinate is decreasing, meaning that the object 1000 leaves the locker 500. It is appreciated that FIG. 7 is only intended to describe an example but not to limit the present disclosure.

In one aspect, the processor 53 takes any one point, an average of multiple points or a gravity center of the pixel region PX_mot as the object coordinate, and outputs a direction signal according to a coordinate change of the object coordinate, e.g., referring to FIG. 7. For example, at least one bit is used to indicate a put-in direction (e.g., X-coordinate increasing in FIG. 7) and a taken-out direction (e.g., X-coordinate decreasing in FIG. 7). In addition, an object size is determined according to the pixel region PX_mot, e.g., determining an object width using two points P1 and P2 shown in FIG. 7. A direction signal S_dir and object size S_siz (e.g., size of the pixel region PX_mot) are outputted to a post control system to record an object state in the locker 500.

Figure 6:
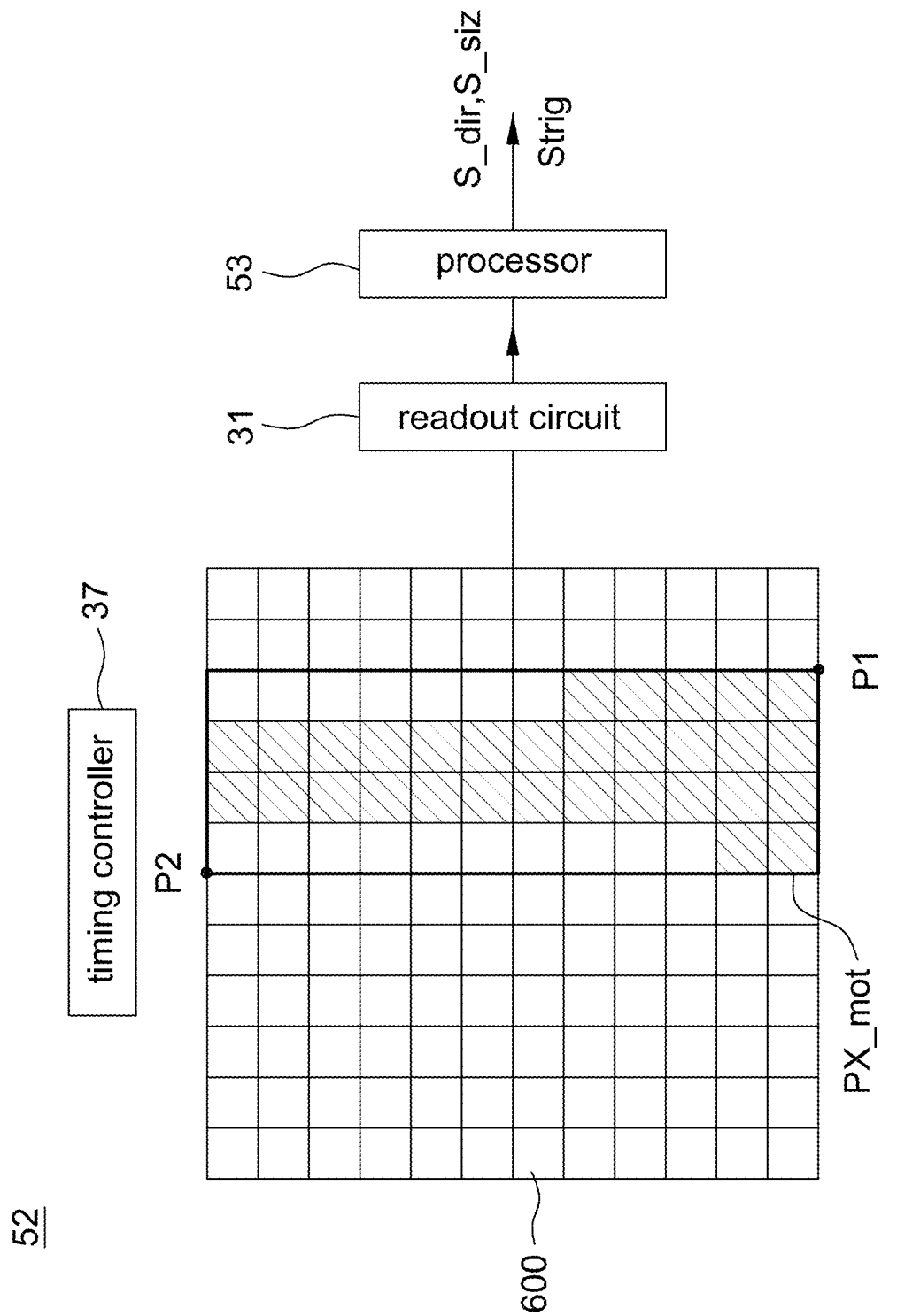
FIG. 6 is a schematic diagram of a motion sensor of a locker according to one embodiment of the present disclosure.

In one aspect, when identifying that a difference value of charges of one pixel is increased or decreased to exceed a predetermined threshold, the processor 53 confirms that the one pixel detects a motion, e.g., pixels filled with slant lines in FIG. 6, such that the processor 53 may determine the object coordinate and size accordingly.

In another aspect, the readout circuit 31 is used to sequentially read the pixel matrix 600 using a readout block (e.g., A1 to A36 shown in FIGS. 1A to 1D), and to calculate a hybrid difference of the temporal difference pixel data between a center pixel and adjacent pixels of the center pixel in the readout block. The processor 53 compares the hybrid difference of each readout block calculated by the readout circuit 31 with a predetermined value to identify whether one pixel detects the motion. The processor 53 counts a number of the readout blocks in the pixel matrix 600 having the hybrid difference larger than the predetermined value, and generates a trigger signal Strig when the number of the readout blocks is larger than a predetermined number, and details thereof are not repeated herein since they have been described above.

The trigger signal Strig is sent to a post control system of the locker 500 indicating that the motion sensor 52 detects an object 1000 in the inner space. In one aspect, the processor 53 identifies the object coordinate only after the trigger signal Strig is generated to accordingly record the entering and leaving traces, e.g., referring to FIG. 7, of the object 1000.

In this embodiment, the motion sensor 52 operates only after the cabinet door 51 is opened. After the cabinet door 51 is sealed/closed, the entering and leaving traces of the object 1000 are recorded in the post control system/platform of the locker 500.

The motion sensor 52 is, for example, a CMOS image sensor, which includes a pixel matrix 600 and a processor 53. The pixel matrix 600 includes a plurality of pixels arranged in a matrix used to output the image frames. The processor 53 is used to identify a moving vector of at least one pixel region having a brightness variation exceeding a variation threshold according to a temporal difference image frame to accordingly output a direction signal S_dir.

Figure 8:
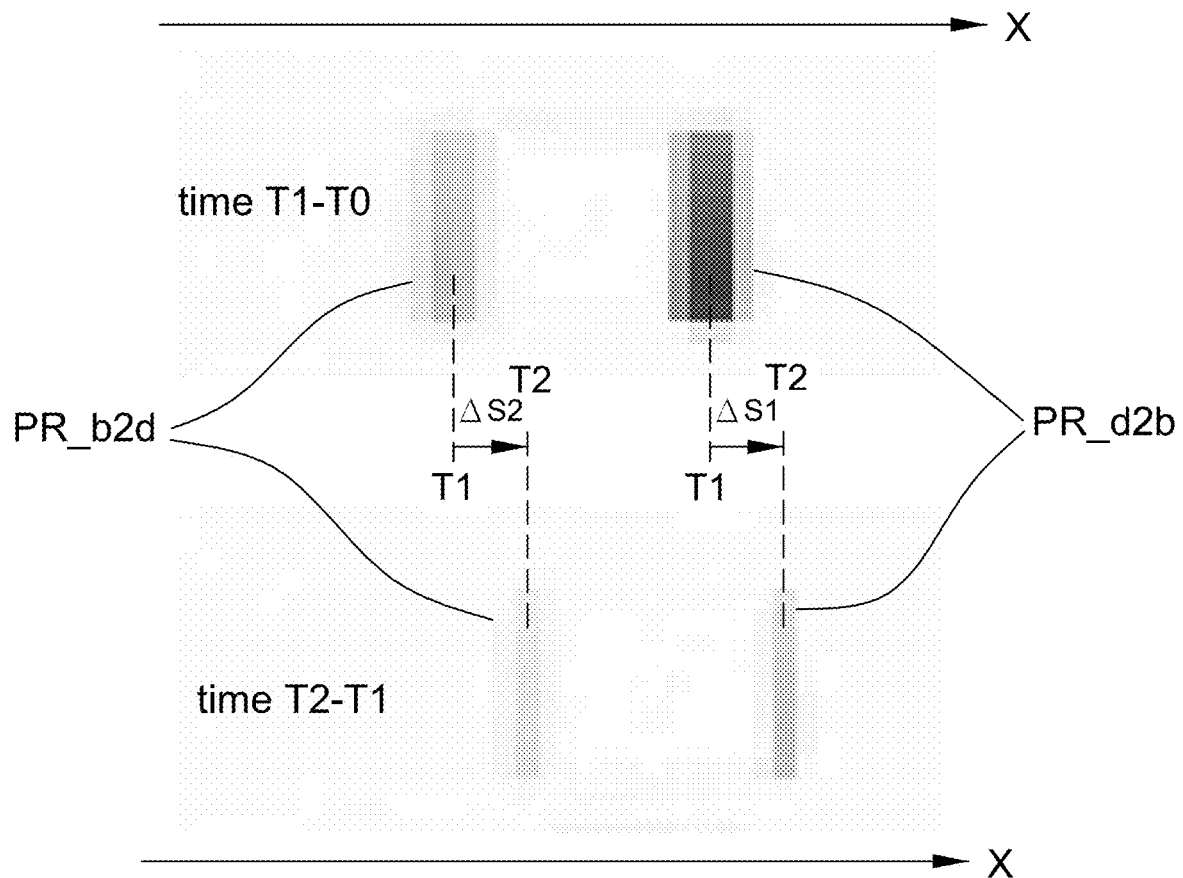
FIG. 8 is a schematic diagram of pixel regions having an identifiable brightness variation detected by a motion sensor of a locker according to one embodiment of the present disclosure.

Please refer to FIG. 8, the pixel region having a brightness variation exceeding a variation threshold includes, e.g., a first pixel region PR_d2b having brightness changing from dark to bright (e.g., from no object at time T0 to having object at time T1 in upper-right part of FIG. 8, and from no object at time T1 to having object at time T2 in lower-right part of FIG. 8) and a second pixel region PR_b2d having brightness changing from bright to dark (e.g., from having object at time T0 to no object at time T1 in upper-left part of FIG. 8, and from having object at time T1 to no object at time T2 in lower-left part of FIG. 8), wherein FIG. 8 shows the object 1000 moving in the X-direction from T1 to T2. If the object 1000 moves in an inverse direction (e.g., toward left), the first pixel regions become those at left side (i.e. from dark to bright) in FIG. 8 and the second pixel regions become those at right side (i.e. from bright to dark) in FIG. 8.

In this embodiment, the processor 53 is used to output the direction signal S_dir according to a moving direction of at least one of the first pixel region PR_d2b and the second pixel region PR_b2d. For example, when the processor 53 calculates a moving vector $\Delta S1$ of the first pixel region PR_d2b in the temporal difference image frame between times T1 and T0 (e.g. shown as time interval T1-T0) and the first pixel region PR_d2b in the temporal difference image frame between times T2 and T1 (e.g. shown as time interval T2-T1) is directed toward X-direction (e.g., right direction in FIG. 8), the direction signal S_dir indicates a rightward moving using at least one bit. Meanwhile, the processor 53 further compares a moving vector $\Delta S2$ of a second pixel region PR_d2b in the temporal difference image frame between times T1 and T0 (e.g. shown as time interval T1-T0) and a second pixel region PR_d2b in the temporal difference image frame between time s T2 and T1 (e.g. shown as time interval T2-T1) with the moving vector $\Delta S1$ as a double check of whether $\Delta S1$ and $\Delta S2$ have the same direction so as to improve the identification accuracy. That is, at least one of $\Delta S1$ and $\Delta S2$ is used to determine a moving direction of the object 1000.

It is appreciated that the temporal difference image frame is not limited to contain two pixel regions as shown in FIG. 8. When the object 1000 has other features, the temporal difference image frame includes multiple pixel regions.

In one aspect, the temporal difference image frame is obtained by the processor 53 by calculating a difference between image frames outputted by the pixel matrix 600 at two different times (e.g., T0 and T1 or T1 and T3). In this aspect, the pixel matrix 600 outputs an image frame acquired at a time point not a temporal difference image frame.

In another aspect, the temporal difference image frame is directly outputted by the pixel matrix 600.

Figure 9A:
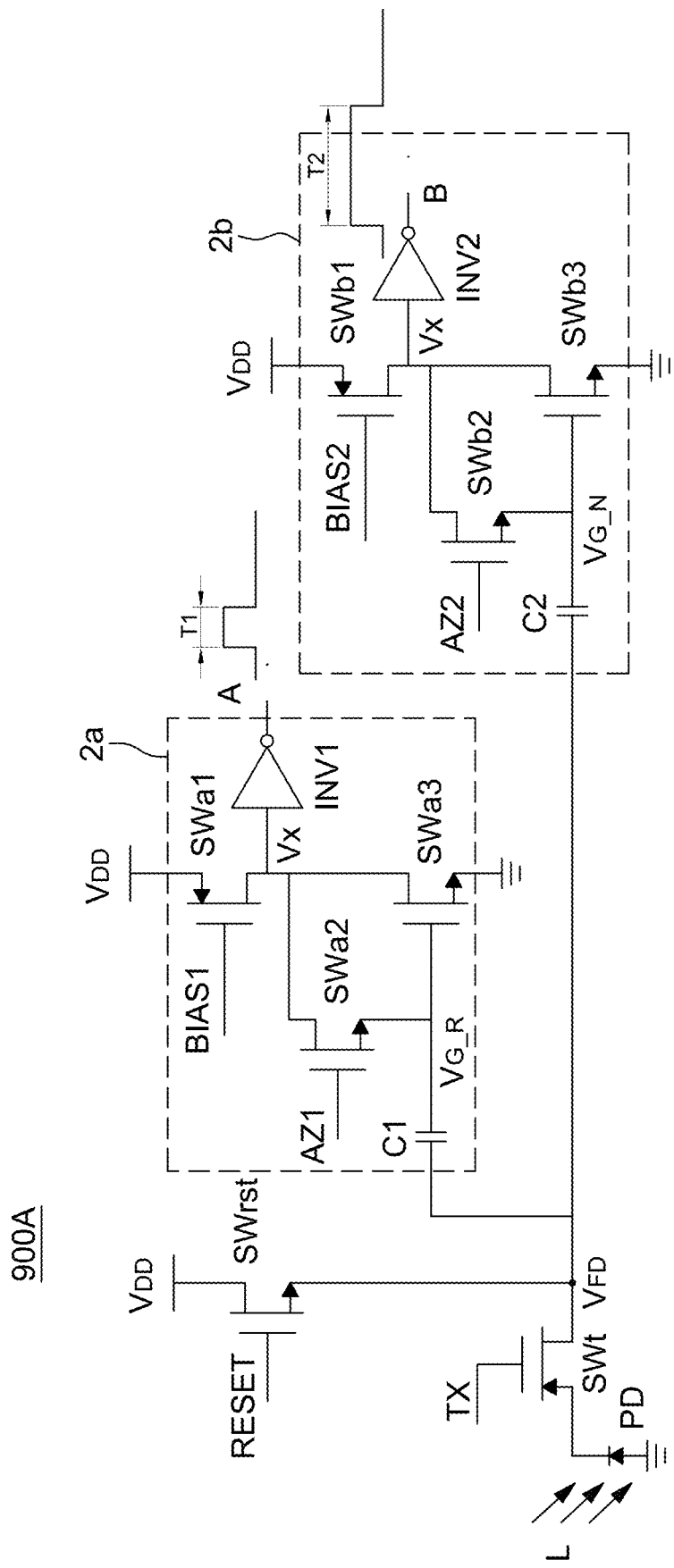
FIG. 9A is a circuit diagram of a pixel circuit of a motion sensor capable of outputting temporal difference pixel data according to one embodiment of the present disclosure.

Please refer to FIG. 9A, it is a circuit diagram of a pixel of the pixel matrix 600 according to one embodiment of the present disclosure. The pixel circuit 900A includes a photodiode PD, a transfer transistor SWt, a reset transistor SWrst, a first temporal circuit 2a and a second temporal circuit 2b, all connected to a node $V_{FD}$.

The photodiode PD is used to generate light energy according to the light L being received. The light energy is respectively stored in the first temporal circuit 2a and the second temporal circuit 2b within different time intervals (e.g., controlled by a control signal TX). In the present disclosure, in addition to storing light energy detected within different time intervals, the first temporal circuit 2a and the second temporal circuit 2b further respectively convert the stored light energy into detection signals A and B having corresponding pulse widths (e.g., T1 and T2) for the subtraction circuit 900C, referring to FIG. 9C, to perform a differential operation. The first temporal circuit 2a and the second temporal circuit 2b have identical circuit arrangement only being operated within different time intervals.

Figure 9B:
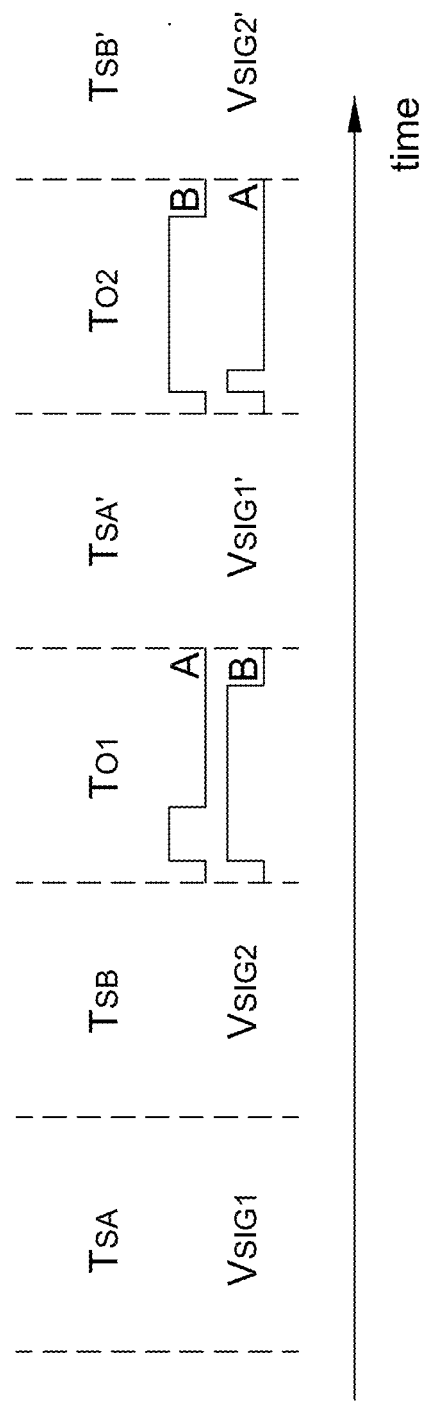
FIG. 9B is a schematic diagram of operating intervals of the motion sensor in FIG. 9A.
Figure 9C:
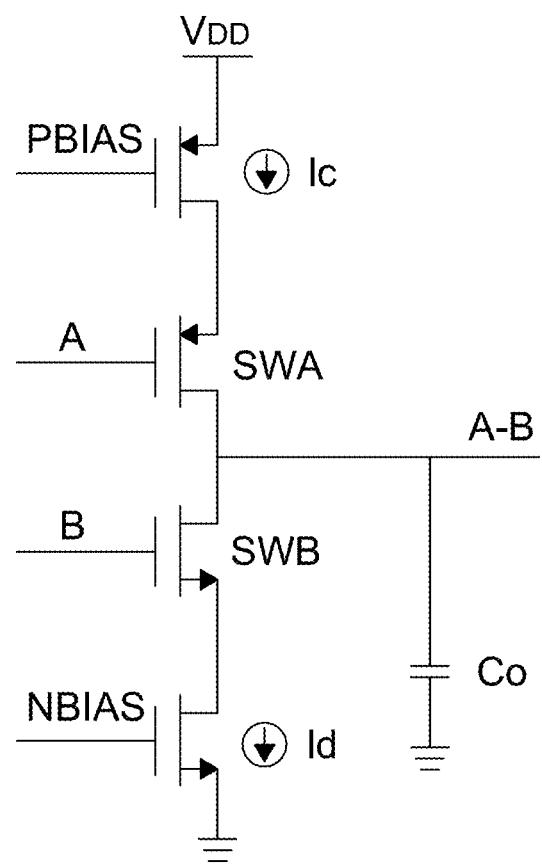
FIG. 9C is a circuit diagram of a subtraction circuit of a motion sensor capable of outputting temporal difference pixel data according to one embodiment of the present disclosure.

The first temporal circuit 2a stores first light energy (e.g., referring to $V_{SIG1}$ shown in FIG. 9B), generated by the photodiode PD within a first interval (e.g., referring to $T_{SA}$ shown in FIG. 9B), and outputs a first detection signal A having a first pulse width T1 according to the first light energy $V_{SIG1}$ within an operation interval (e.g., referring to $T_{O1}$ shown in FIG. 9B).

The second temporal circuit 2b stores second light energy (e.g., referring to $V_{SIG2}$ shown in FIG. 9B) generated by the photodiode PD within a second interval (e.g., referring to $T_{SB}$ shown in FIG. 9B), and outputs a second detection signal B having a second pulse width T2 according to the second light energy $V_{SIG2}$ within the operation interval $T_{O1}$. It is appreciated that lengths of T1 and T2 in drawings are only intended to illustrate but not to limit the present disclosure.

The subtraction circuit 900C is coupled to the first temporal circuit 2a and the second temporal circuit 2b to perform the differential operation on the first detection signal A and the second detection signal B to obtain a temporal difference pixel data, and all pixels may form a temporal difference image frame. The subtraction circuit 900C has two inputs respectively coupled to the first temporal circuit 2a and the second temporal circuit 2b to respectively receive a first detection signal A having a first pulse width T1 and a second detection signal B having a second pulse width T2. The subtraction circuit 900C includes an operation capacitor Co and cascaded first operation transistor SWA and second operation transistor SWB, wherein the operation capacitor Co is connected between the first operation transistor SWA and the second operation transistor SWB. The first operation transistor SWA is used as a switch to control a charging interval of a first current Ic to charge the operation capacitor Co according to the first pulse width T1; and the second operation transistor SWB is used as a switch to control a discharging interval of a second current Id to discharge the operation capacitor Co according to the second pulse width T2, wherein the first current Ic is substantially identical to the second current Id. In this way, the subtraction circuit 900C performs the numerical calculation of A-B.

The reset transistor SWrst is coupled between a voltage source $V_{DD}$ and the node $V_{FD}$, and used to reset the first temporal circuit 2a in the first interval $T_{SA}$ and reset the second temporal circuit 2b in the second interval $T_{SB}$.

The transfer transistor SWt is coupled between the photodiode PD and the node $V_{FD}$, and used to transfer the first light energy $V_{SIG1}$ to be stored into the first temporal circuit 2a in the first interval $T_{SA}$ and transfer the second light energy $V_{SIG2}$ to be stored into the second temporal circuit 2b in the second interval $T_{SB}$. In this way, the pixel circuit 900A stores detected light energy of different time intervals to indicate the variation of detected light with time.

In some aspects, the first temporal circuit 2a further includes a first inverter INV1 coupled between an output terminal of the first temporal circuit 2a and the subtraction circuit 900C, and the first inverter INV1 is used to invert a phase of the first detection signal A; the second temporal circuit 2b further includes a second inverter INV2 coupled between an output terminal of the second temporal circuit 2b and the subtraction circuit 900C, and the second inverter INV2 is used to invert a phase of the second detection signal B. In other aspects, the first inverter INV1 and the second inverter INV2 are arranged in the subtraction circuit 900C instead of being arranged in the first temporal circuit 2a and the second temporal circuit 2b.

Other details of the pixel circuit 900A and the subtraction circuit 900C may be referred to U.S. patent application Ser. No. 18/244,296, filed on Sep. 11, 2023, assigned to the same assignee of the present application, and the full disclosure thereof is incorporated herein by reference.

Please refer to FIGS. 10A to 10C and FIGS. 11A to 11C, they are schematic diagrams of the locker 500 at different states (e.g., at time t1, t2 and t3) according to other embodiments of the present disclosure. In these embodiments, a motion sensor 52 is arranged inside the locker 500 and used to acquire a current image frame of an inner space of the locker 500. The motion sensor 52 also includes a pixel matrix 600 and a processor 53, e.g., referring to FIG. 6. These embodiments further include a frame buffer 54 for recording a background image frame Im_b. The processor 53 compares the current image frame and the background image frame Im_b to identify whether there is an object 1000 in the inner space.

It should be mentioned that although FIGS. 10A to 10C and FIGS. 11A to 11C show that the frame buffer 54 is separated from the motion sensor 52, they are only intended to illustrate but not to limit the present disclosure. In other aspects, the frame buffer 54 is included in the motion sensor 52.

Figure 10A:
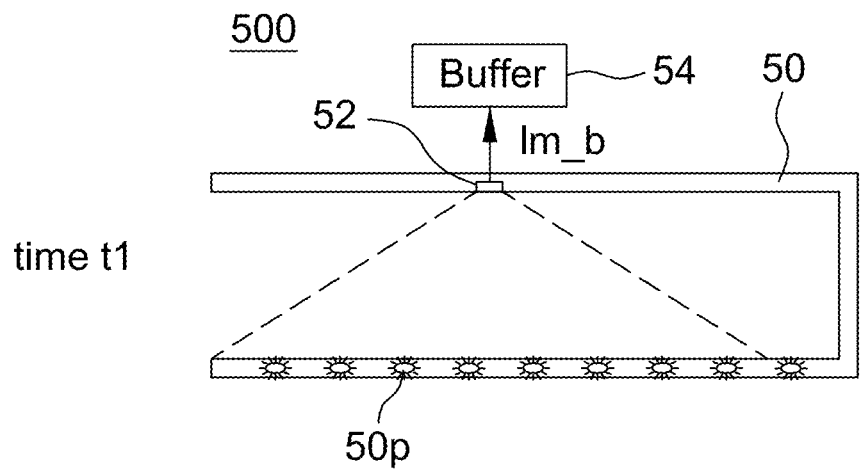
FIGS. 10A to 10C are schematic diagrams of different states of a locker according to another embodiment of the present disclosure.
Figure 10B:
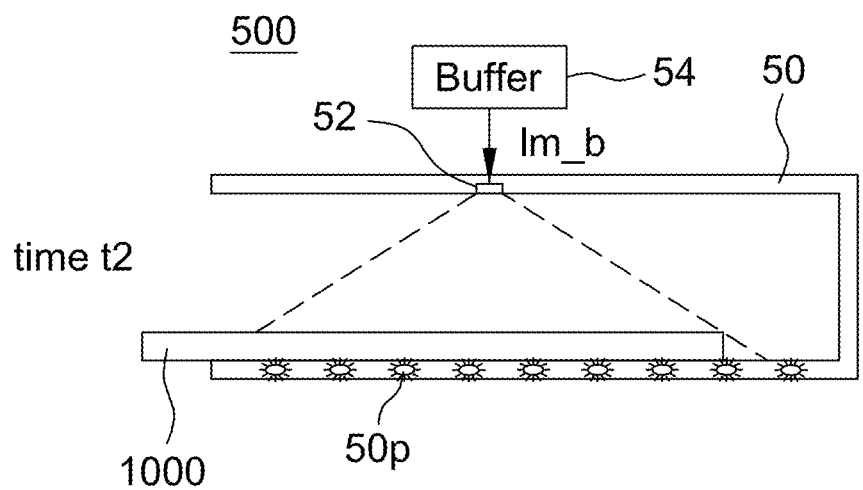
Figure 10C:
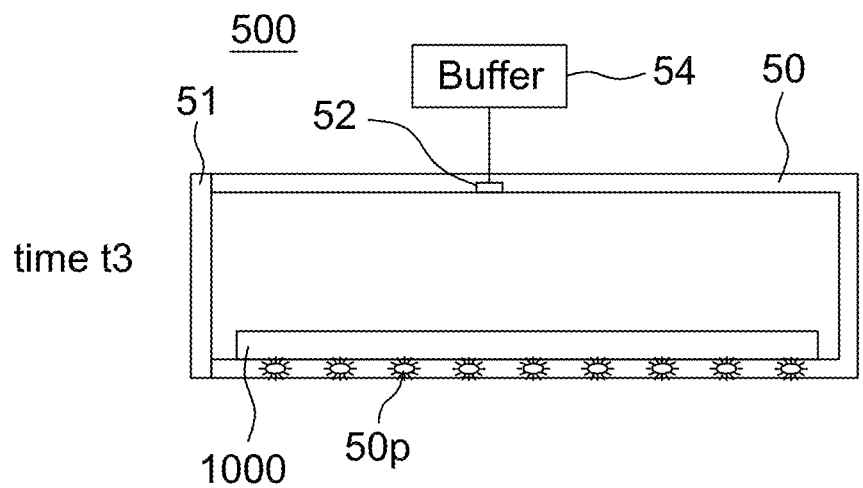

Please refer to FIGS. 10A to 10C, in this embodiment, the background image frame is an image frame acquired by the motion sensor 52 when the cabinet door 51 is opened and the inner space is empty, e.g., Im_b acquired at time t1 and recorded in the frame buffer 54. During operation, the motion sensor 52 continuously acquires multiple image frames when the cabinet door 52 is opened, e.g., at time t2. The processor 52 takes at least one image frame acquired right before the cabinet door 51 is sealed as the current image frame, and compares the current image frame with a background image frame Im_b read from the frame buffer 54 to confirm whether there is an object 1000 inside the inner space, wherein the at least one image frame preferably has an average brightness higher than a predetermined brightness and is acquired as close to the sealing of the cabinet door 51 as possible. That is, when the cabinet door 51 is sealed, e.g., at time t3, the motion sensor 52 does not acquire any image frame, and the processor 53 does not compare the current image frame and the background image frame Im_b. In one aspect, the locker 500 further includes a light source (e.g., light emitting diode, but not limited to) which is turned on when the cabinet door 51 is opened so as to ensure the current image frame has enough brightness.

Figure 11A:
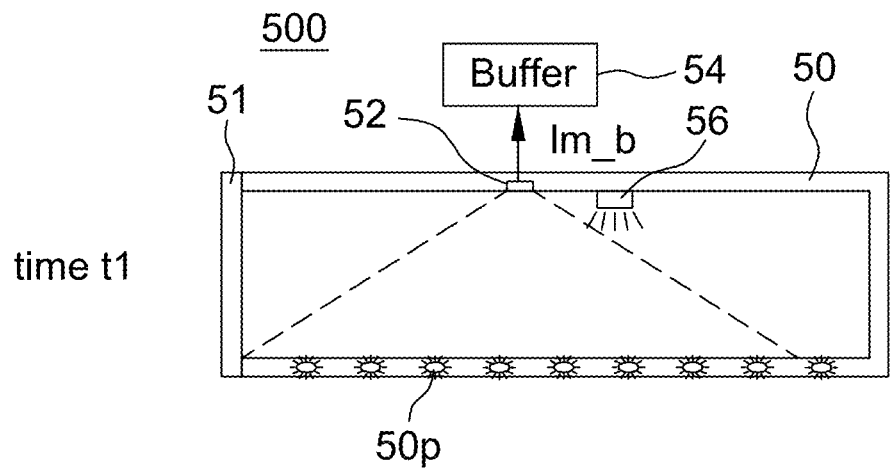
FIGS. 11A to 11C are schematic diagrams of different states of a locker according to a further embodiment of the present disclosure.
Figure 11B:
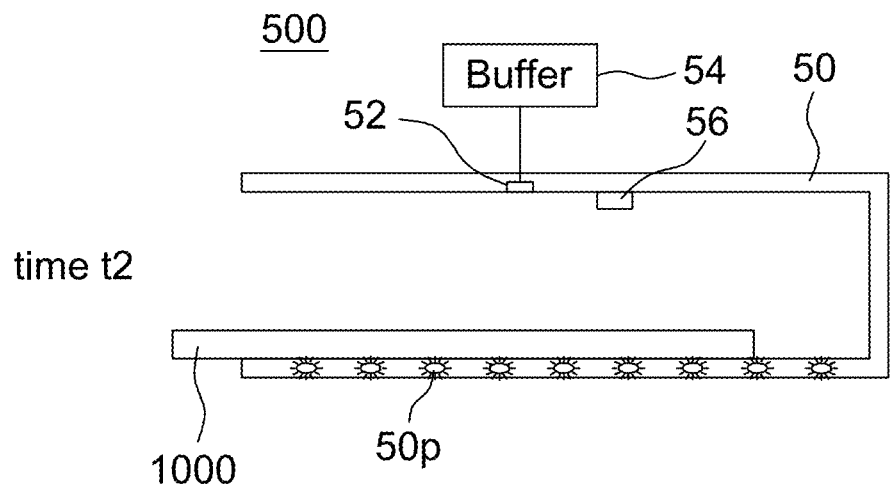
Figure 11C:
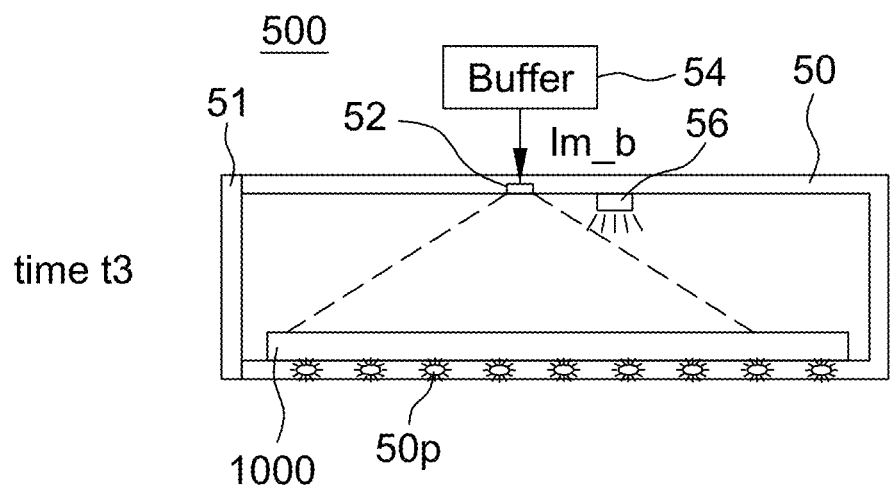

Please refer to FIGS. 11A to 11C, in this embodiment, the background image frame Im_b is an image frame acquired by the motion sensor 52 when the cabinet door 51 is sealed/closed, e.g., at time t1. The motion sensor 52 is used to acquire a current image frame (e.g., a single image frame) when the cabinet door 51 is sealed/closed, e.g., at time t3. Since this embodiment is operated when the cabinet door 51 is sealed, the locker 500 further includes a light source (e.g., light emitting diode) 56 arranged inside the locker 500. The light source 56 is used to illuminate the inner space when the cabinet door 51 is sequentially opened and sealed, i.e. a signal respectively generated in opening and sealing the cabinet door 51. After the motion sensor 52 acquires the current image frame, the light source 56 may be turned off to save power.

In this embodiment, the light source 56 and the motion sensor 52 are preferably deactivated when the cabinet door 51 are opened to save power, referring to FIG. 11B. In FIGS. 11A and 11C, the light source 56 emits light when the cabinet door 51 is closed and the motion sensor 52 is capturing image frames.

In one aspect, the frame buffer 54 is recorded with, e.g., before shipment, multiple background image frames corresponding to different types (e.g., different sizes or shapes) of the locker 500. When the cabinet door 51 is opened, the processor 52 selects a background image frame corresponding to a type of an opened locker to be compared with the current image frame. In this way, the present disclosure is adaptable to the system having multiple different lockers.

In one aspect, an inner surface inside the cabinet body 50 opposite to the motion sensor 52 is arranged (e.g., painted, attached, sputtered) with a predetermined pattern(s) 50p. The predetermined pattern(s) 50p is, for example, a trademark pattern or a customized pattern. In this way, the processor 52 recognizes the covered part of the predetermined pattern(s) 50 in comparing the current image frame and the background image frame to identify whether there is an object 1000 in the inner space and the occupancy of the object 1000.

In the present disclosure, the motion sensor mentioned is, for example, a camera having a processor 53 therein.

The motion sensor 52 of the present disclosure is adaptable to identify the occupancy of different spaces without being limited to the locker 500 mentioned above. The processor 53 identifies the occupancy, crowdedness or residual space of an accommodation space by comparing a background image frame (e.g., previously recorded as a reference image for indicating an empty space) with a current image frame.

Figure 12:
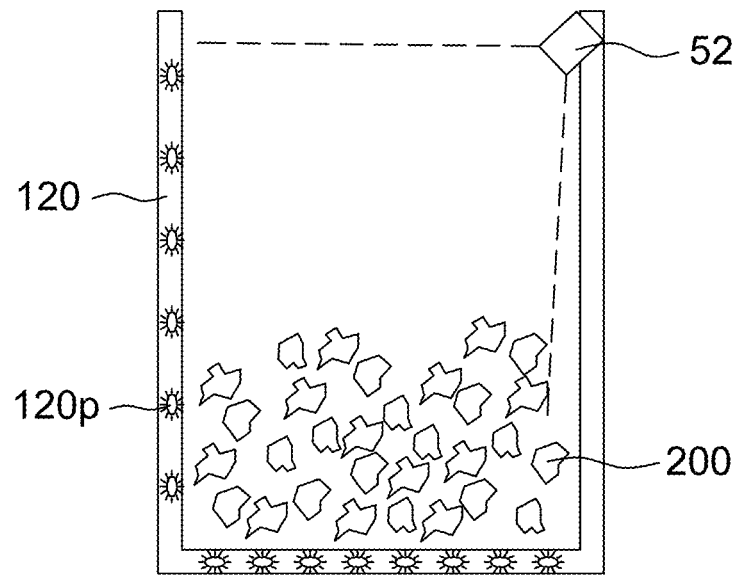
FIG. 12 is a schematic diagram of applying a motion sensor of the present disclosure to a trash can.

For example referring to FIG. 12, it is a schematic diagram of applying the motion sensor 52 of the present disclosure to a trash can 120. The motion sensor 52 also includes a frame buffer 54 (referring to FIGS. 10A-10C and FIGS. 11A to 11C) for recording a background image frame. For example, an image frame captured by the motion sensor 52 when the trash can 120 is empty is recorded in the frame buffer 54 as the background image frame. The processor 53 of the motion sensor 52 compares a current image frame (e.g., acquired at a predetermined frequency) with the background image frame to identify the occupancy of the inner space of the trash can 120. For example, when identifying that the occupancy of the inner space exceeds a predetermined percentage, e.g., 50% to 80%, the processor 53 outputs a trigger signal Strig to inform a user to clear the inner space. The trigger signal Strig is sent to a portable device of the user or directly used to control an indicator, e.g., lamp or speaker, of the trash can 12 to give an alarm.

In one aspect, an inner surface (e.g., shown at the inner surface within a field of view of the motion sensor 52) of the trash can 120 is arranged with (e.g., painted, attached or sputtered) a predetermined pattern(s) 120*p*. The processor 53 identifies the occupancy of the inner space according to the predetermined pattern(s) 120*p* (e.g., covered part or uncovered part) between the current image frame and the background image frame.

Figure 13:
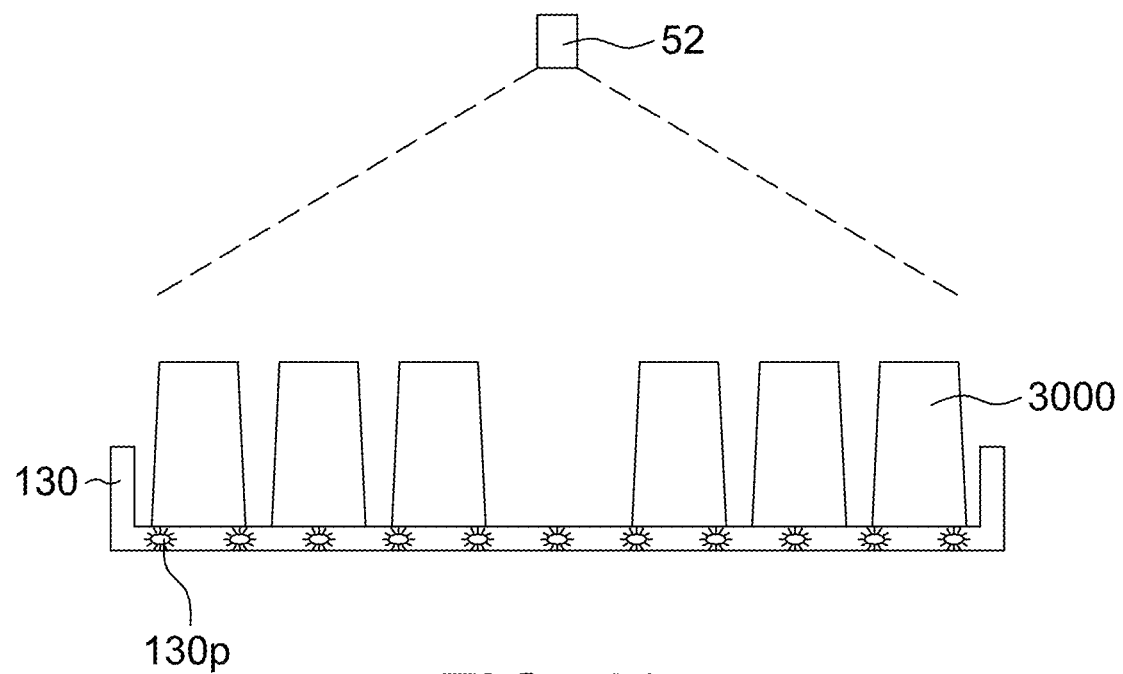
FIG. 13 is a schematic diagram of applying a motion sensor of the present disclosure to a storage space.

For example referring to FIG. 13, it is a schematic diagram of applying the motion sensor 52 of the present disclosure to a storage space 130 of a recycle area of dishes and cups or a storage space 130 of a warehouse. The motion sensor 52 also includes a frame buffer 54 (referring to FIGS. 10A-10C and FIGS. 11A to 11C) for recording a background image frame. For example, an image frame captured by the motion sensor 52 when the storage space 130 is empty is recorded in the frame buffer 54 as the background image frame. The processor 53 of the motion sensor 52 compares a current image frame (e.g., acquired at a predetermined frequency) with the background image frame to identify the occupancy of the storage space 130. For example, when identifying that the occupancy of the storage space 130 exceeds a predetermined percentage, e.g., 50% to 80%, the processor 53 outputs a trigger signal Strig to inform a user to clean the storage space 130. The trigger signal Strig is sent to a portable device of the user or directly used to control an indicator, e.g., lamp or speaker, of the control system to give an alarm.

In one aspect, an inner surface (e.g., shown at the inner surface within a field of view of the motion sensor 52) of the storage space 130 is arranged with (e.g., painted, attached or sputtered) a predetermined pattern(s) 130*p*. The processor 53 identifies the occupancy of the storage space 130 according to the predetermined pattern(s) 130*p* (e.g., covered part or uncovered part) between the current image frame and the background image frame.

Figure 14:
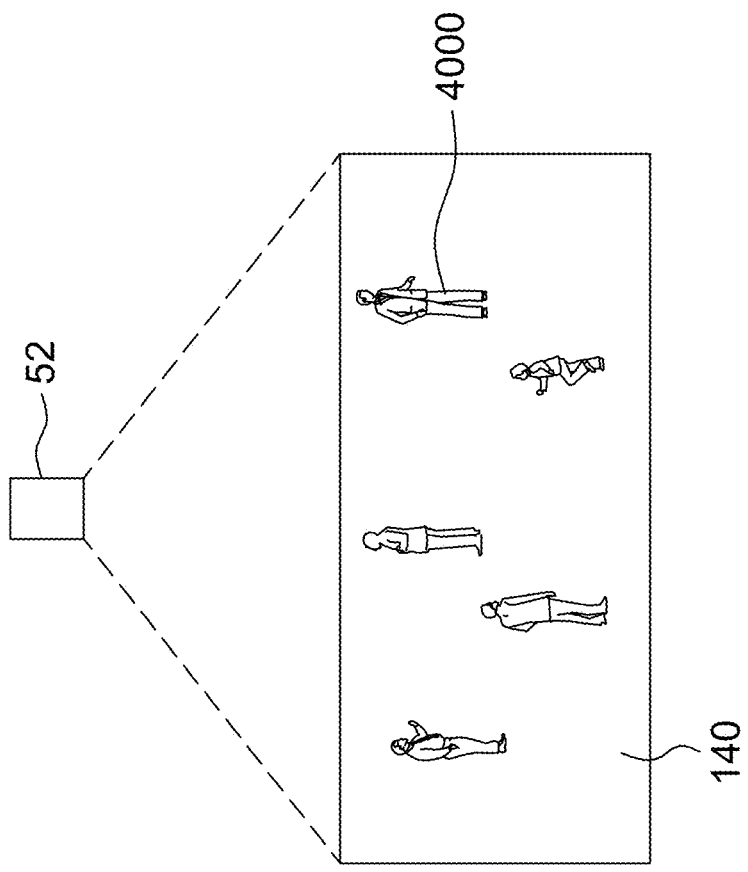
FIG. 14 is a schematic diagram of applying a motion sensor of the present disclosure to a vehicle inner space.
Figure 14:
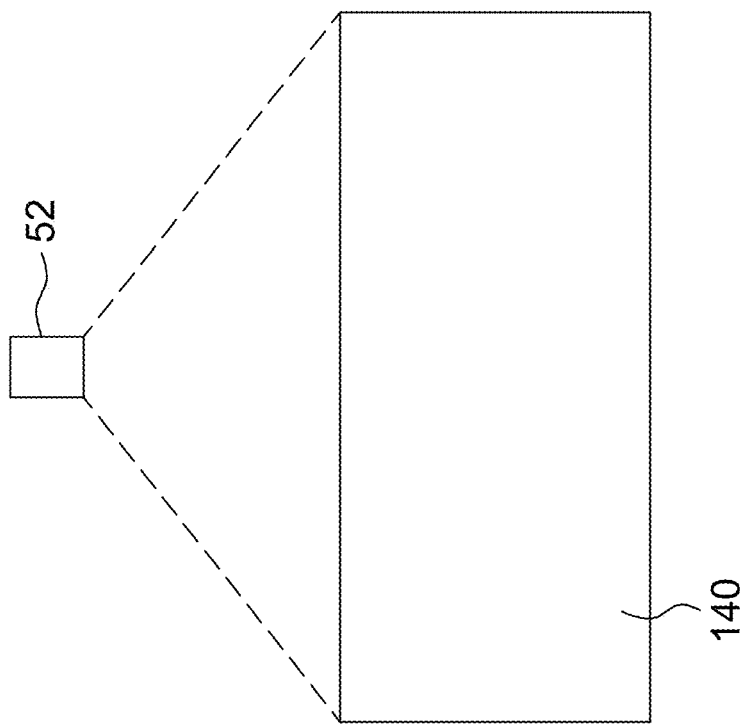

For example referring to FIG. 14, it is a schematic diagram of applying the motion sensor 52 of the present disclosure to a vehicle inner space 140. The motion sensor 52 also includes a frame buffer 54 (referring to FIGS. 10A-10C and FIGS. 11A to 11C) for recording a background image frame. For example, an image frame captured by the motion sensor 52 when the vehicle inner space 140 is empty is recorded in the frame buffer 54 as the background image frame. The processor 53 of the motion sensor 52 compares a current image frame (e.g., acquired at a predetermined frequency) with the background image frame to identify the occupancy of the vehicle inner space 140. The comparison is preferably performed by the processor 53 when all doors of the vehicle are closed, e.g., the motion sensor 52 being arranged not to capture the current image frame for the comparison when at least one of the doors of the vehicle is opened.

For example, when identifying that there is still a member or object 400 in the vehicle inner space 140 when the vehicle engine or power source is turned off as well as all doors are closed, the processor 53 outputs a trigger signal Strig to inform a user to check the vehicle inner space 140. The trigger signal Strig is sent to a portable device of the user or directly used to control an indicator, e.g., lamp or speaker, of the vehicle to give an alarm.

However, the background image frame is not limited to be captured when the vehicle inner space 140 is empty. In another aspect, the background image frame is captured by the motion sensor 52 prior to the current image frame by a predetermined time interval (even at a time that the inner space 140 is not empty), e.g., the latest image frame previous to the current image frame or an image frame previous to the current image frame by a predetermined number of image frames. In this aspect, the background image frame is updated every predetermined time interval.

In one aspect, when it is necessary to recognize a member ID in the vehicle, e.g., identifying a baby or a child, the processor 53 of the motion sensor 52 is further embedded with a recognition model (e.g. constructed using a machine learning algorithm, which is implemented by software and/or hardware). When the vehicle engine or power source is turned off and there is still an object 4000 being identified in the vehicle inner space 140, the processor 53 runs the recognition model to recognize whether there is a person in the vehicle inner space 140 to avoid accidently leaving a baby or a child in the vehicle.

More specifically, the motion sensor 52 of the present disclosure is adaptable to the object recognition in any space without being limited to the locker, trash can, storage space and vehicle inner space mentioned herein. If it is required, a machine learning algorithm and model parameters are embedded in the processor 53 of the motion sensor 52 to perform the object recognition and send the recognized result to a post control system/platform.

It should be mentioned that the values in the above embodiments, e.g., a number of pixels, a number of matrices and the threshold are only intended to illustrate but not to limit the present disclosure.

As mentioned above, in the conventional sensor having a pixel matrix, at least two frame buffers are required to temporarily store image frames outputted by the pixel matrix at different times. Therefore, the present disclosure further provides a motion sensor (e.g., as shown in FIGS. 1A-1D) and a navigation device (as shown in FIGS. 3-4) that uses a pixel matrix to output temporal difference pixel data. Then, the temporal difference pixel data at different positions of a readout block is spatial-differenced so as to accomplish the hybrid difference calculation during reading pixel data without using the frame buffer. The processor directly performs the following controls according to the result of hybrid difference such that the temporal difference calculation is not performed in the digital phase.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A locker, comprising:
a cabinet body, having an inner space;
a cabinet door, configured to seal or open the inner space;
a motion sensor, arranged inside the locker, configured to acquire images of the inner space when the cabinet door is opened, and the motion sensor comprising:
a pixel matrix, comprising a plurality of pixels arranged in a matrix, and each of the plurality of pixels being configured to output a temporal difference pixel data, and a processor, configured to identify multiple pixels detecting a motion according to the temporal difference pixel data, and identify an object coordinate in the locker according to the multiple pixels; and a readout circuit, configured to sequentially read the pixel matrix using a readout block, and calculate a hybrid difference of the temporal difference pixel data between a center pixel and adjacent pixels of the center pixel in the readout block.

2. The locker as claimed in claim 1, wherein the temporal difference pixel data is a difference value of charges between a current time and a reference time generated by each of the plurality of pixels.

3. The locker as claimed in claim 2, wherein when the difference value of charges of one pixel is increased or decreased to exceed a predetermined threshold, the processor identifies that the one pixel detects the motion.

4. The locker as claimed in claim 1, wherein the processor is further configured to output a direction signal according to a coordinate variation of the object coordinate, and determine an object size according to the multiple pixels.

5. The locker as claimed in claim 1, wherein the processor is further configured to compare the hybrid difference of each readout block calculated by the readout circuit with a predetermined value to identify whether one pixel detects the motion, count a number of the readout blocks having the hybrid difference larger than the predetermined value, and generate a trigger signal when the number of the readout blocks is larger than a predetermined number.

6. The locker as claimed in claim 5, wherein the processor is configured to identify the object coordinate only after the trigger signal is generated.

7. A locker, comprising:

a cabinet body, having an inner space;

a cabinet door, configured to seal or open the inner space; and a motion sensor, arranged inside the locker, and configured to acquire image frames of the inner space when the cabinet door is opened, and the motion sensor comprising:

a pixel matrix, comprising a plurality of pixels arranged in a matrix, and configured to output the image frames; and a processor, configured to identify a moving vector of at least one pixel region having a brightness variation exceeding a variation threshold according to a temporal difference image frame to accordingly output a direction signal, wherein the temporal difference image frame is directly outputted by the pixel matrix, and each of the multiple pixels comprises:

a photodiode, configured to generate light energy:

a first temporal circuit, configured to store first light energy, generated by the photodiode, within a first interval, and output a first detection signal having a first pulse width according to the first light energy within an operation interval;

a second temporal circuit, configured to store second light energy, generated by the photodiode, within a second interval, and output a second detection signal having a second pulse width according to the second light energy within the operation interval; and a subtraction circuit, coupled to the first temporal circuit and the second temporal circuit, and configured to perform a differential operation on the first detection signal and the second detection signal to obtain the temporal difference image frame.

8. The locker as claimed in claim 7, wherein the at least one pixel region comprises a first pixel region having brightness changing from dark to bright and a second pixel region having brightness changing from bright to dark, and the processor is configured to output the direction signal according to a moving vector of at least one of the first pixel region and the second pixel region.

9. The locker as claimed in claim 7, wherein the subtraction circuit comprises:

an operating capacitor;

a first operation transistor, configured to control a charging interval of a first current to charge the operation capacitor according to the first pulse width within the operation interval; and a second operation transistor, configured to control a discharging interval of a second current to discharge the operation capacitor according to the second pulse width within the operation interval.

* * * * *